Figure 1:
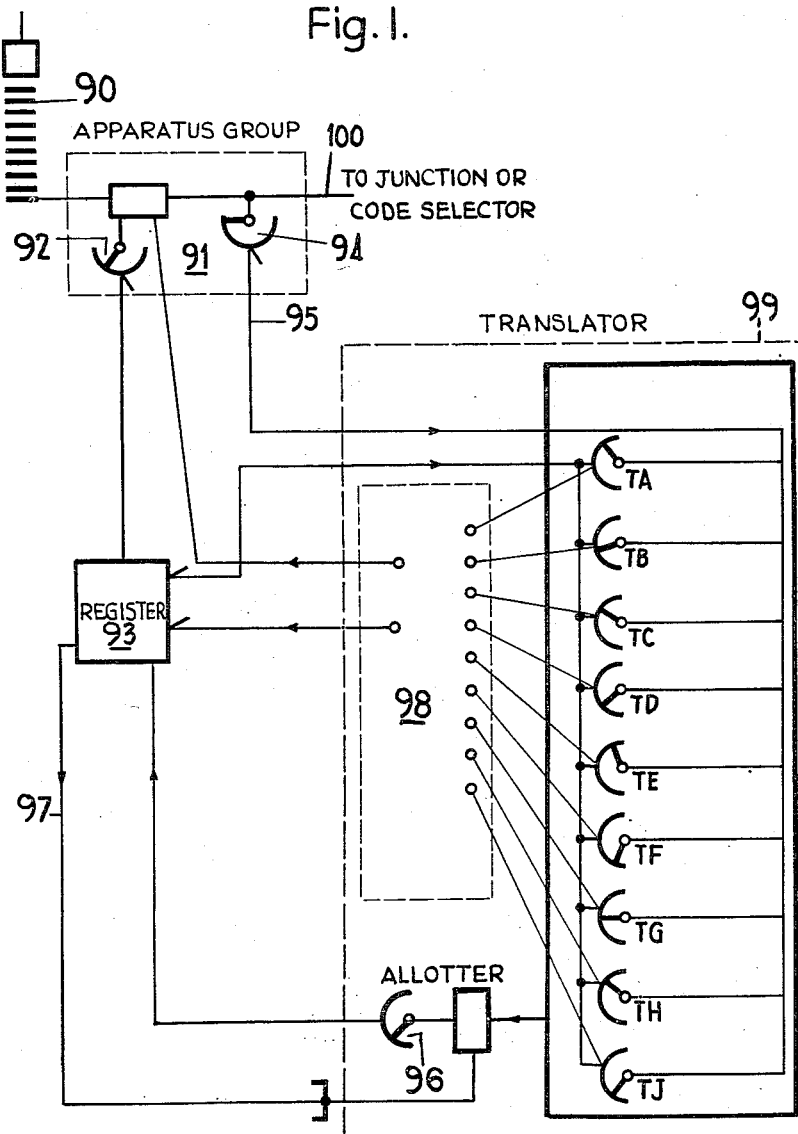

Feb. 25, 1958        J. SCOWCROFT        2,824,910
ELECTRICAL TELECOMMUNICATION SYSTEMS
Filed March 4, 1955        16 Sheets-Sheet 6
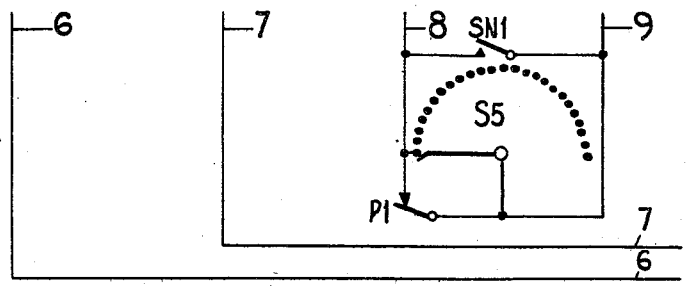
Fig. 6.
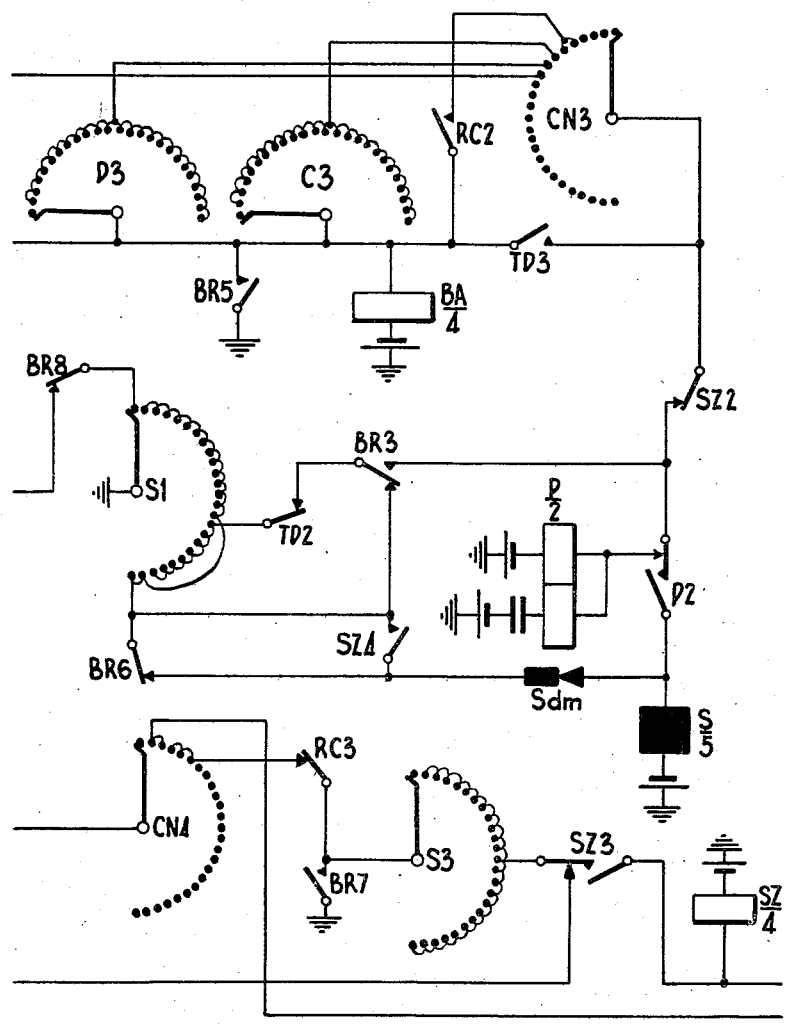
INVENTOR
John Scowcroft
BY
ATTORNEY Feb. 25, 1958 J. SCOWCROFT 2,824,910
ELECTRICAL TELECOMMUNICATION SYSTEMS
Filed March 4, 1955 16 Sheets-Sheet 10

INVENTOR
John Scowcroft
ATTORNEY

000# United States Patent Office 2,824,910
Patented Feb. 25, 1958

2,824,910

ELECTRICAL TELECOMMUNICATION SYSTEMS

John Scowcroft, Coventry, England, assignor to The General Electric Company Limited, London, England Application March 4, 1955, Serial No. 492,063

13 Claims. (Cl. 179—18)

This invention relates to electrical telecommunication systems in which trains of electrical impulses are employed to set switches so as to establish a signalling path between a calling station and a called station, the said impulse trains being initiated under the control of the calling station, as for example by means of a telephone dial. The invention is more particularly concerned with such systems in which provision is made so that when the calling station and the called station are associated each with a different switching centre, such as an automatic telephone exchange, some of the impulse trains are translated into further impulse trains which are employed to establish a signalling path between the originating switching centre of the calling station and the objective switching centre of the called station, either directly or by way of one or more intermediate switching centres, and other of the impulse trains are employed at the objective switching centre to extend the signalling path to the called station.

In automatic telephone systems of this kind it is known for a calling party to dial a series of say seven digits of which the first three, the so called routing digits, characterise the objective telephone exchange, and the remaining four digits represent the directory number of the wanted party at that exchange. The trains of impulses corresponding each to a different one of the dialled digits are received by the exchange, hereinafter referred to as the originating exchange, to which the calling station is connected, by line wires, where the first three impulse trains are usually translated into further trains of electrical impulses, the so called route code. The impulse trains of the route code are employed to extend a signalling path from the originating exchange to the objective exchange over a predetermined route, this route usually being by way of one or more intermediate telephone exchanges. The last four impulse trains are transmitted unchanged to the objective exchange where they are employed to set switches so as to select the telephone station of the wanted party. As the interval between successive impulse trains of such a series is small it is usual to store at least the last four impulse trains in a register until the route of the objective exchange has been established.

It is an object of the present invention to provide an improved arrangement whereby translation may be effected of trains of electrical impulses, such translation being with or without change in the number of impulses in an impulse train and with or without change in the number of trains.

According to the present invention, an arrangement for use at a switching centre of a telecommunication system of the kind in which trains of electrical impulses are employed to effect switch setting and which is adapted to translate information in the form of a plurality of trains of electrical impulses to information in the form of other trains of electrical impulses comprises, a plurality of apparatus groups, a lesser plurality of registers which are accessible to the said apparatus groups, and a translator which is available to any one of the registers, the arrangement being such that when, during operation, a plurality of trains of electrical impulses are supplied to any one of the said apparatus groups, that apparatus group, which is adapted to store the information of the first train of the plurality, obtains access to a register which stores at least the information represented by the plurality of impulse trains after the first, and the said translator subsequently effects the desired translator.

According to a feature of the present invention an arrangement for use at a switching centre of a telecommunications system of the kind in which trains of electrical impulses are employed to effect switch setting and which is adapted to translate information in the form of a plurality of trains of electrical impulses to information in the form of other trains of electrical impulses comprises a plurality of apparatus groups, a lesser plurality of registers that are accessible to the said apparatus groups, and a single translator that is available over a plurality of routes both to any one of the said registers and to any one of the said apparatus groups so that when during operation the translator is so available to any particular register and to any particular apparatus group, the register is that one to which the apparatus group has access and the translation effected by the translator is determined by the information supplied by both the apparatus group and the register to which it is then available.

According to a second feature of the present invention an arrangement for use at a switching centre of a telecommunications system of the kind in which trains of electric impulses are employed to effect switch setting and which is adapted to translate information in the form of a plurality of trains of electrical impulses to information in the form of other trains of electrical impulses comprises a plurality of apparatus groups, each having a first group of terminals and a second group of terminals, a lesser plurality of registers that are accessible to the apparatus groups, and a single translator available both to any one of the registers and to any one of the apparatus groups over a plurality of routes, the arrangement being such that when, during operation, trains of electrical impulses are supplied to the first group of terminals of any particular apparatus group, information relating to the said impulse trains is stored both by the apparatus group and by the register to which that apparatus group has access, translation of the information which relates to a predetermined number of the said impulse trains being effected by the translator when available as aforesaid to the said apparatus group and to the said register, and trains of electrical impulses representative of the translation being supplied by way of the said apparatus group to its second group of terminals.

Figure 2:
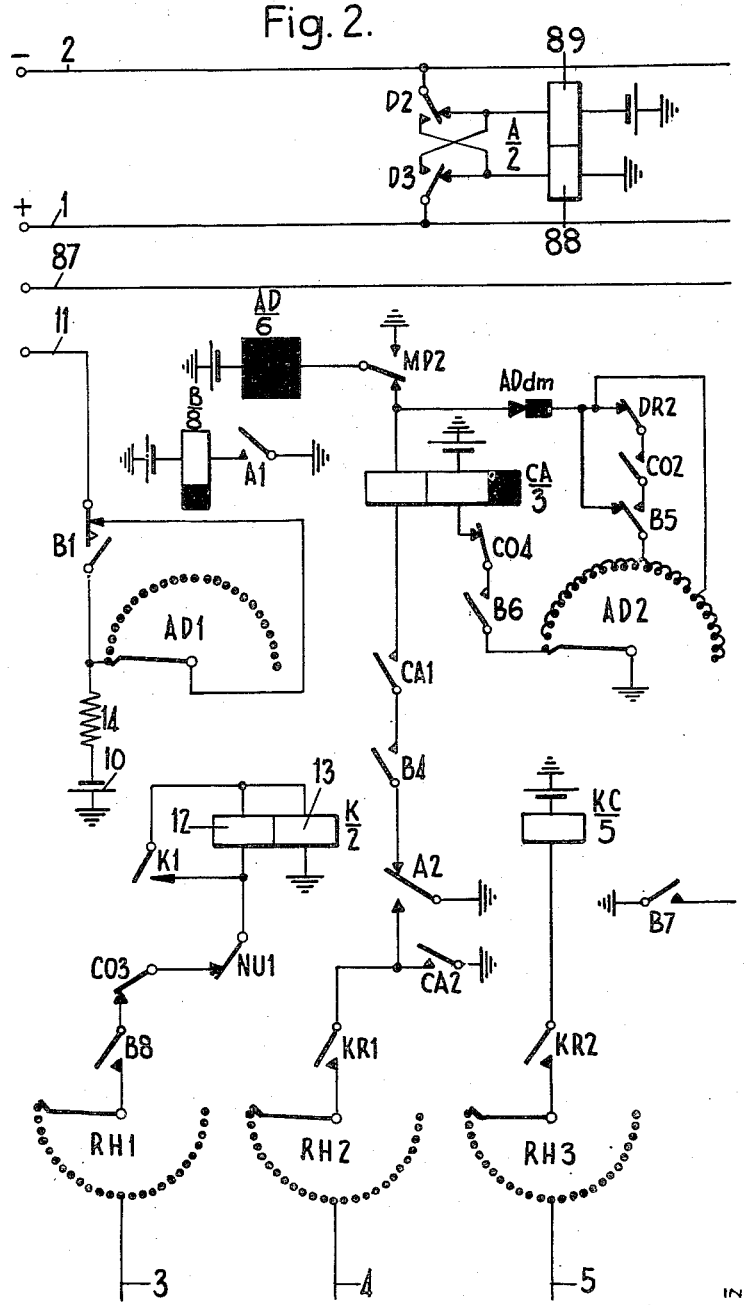
Figure 3:
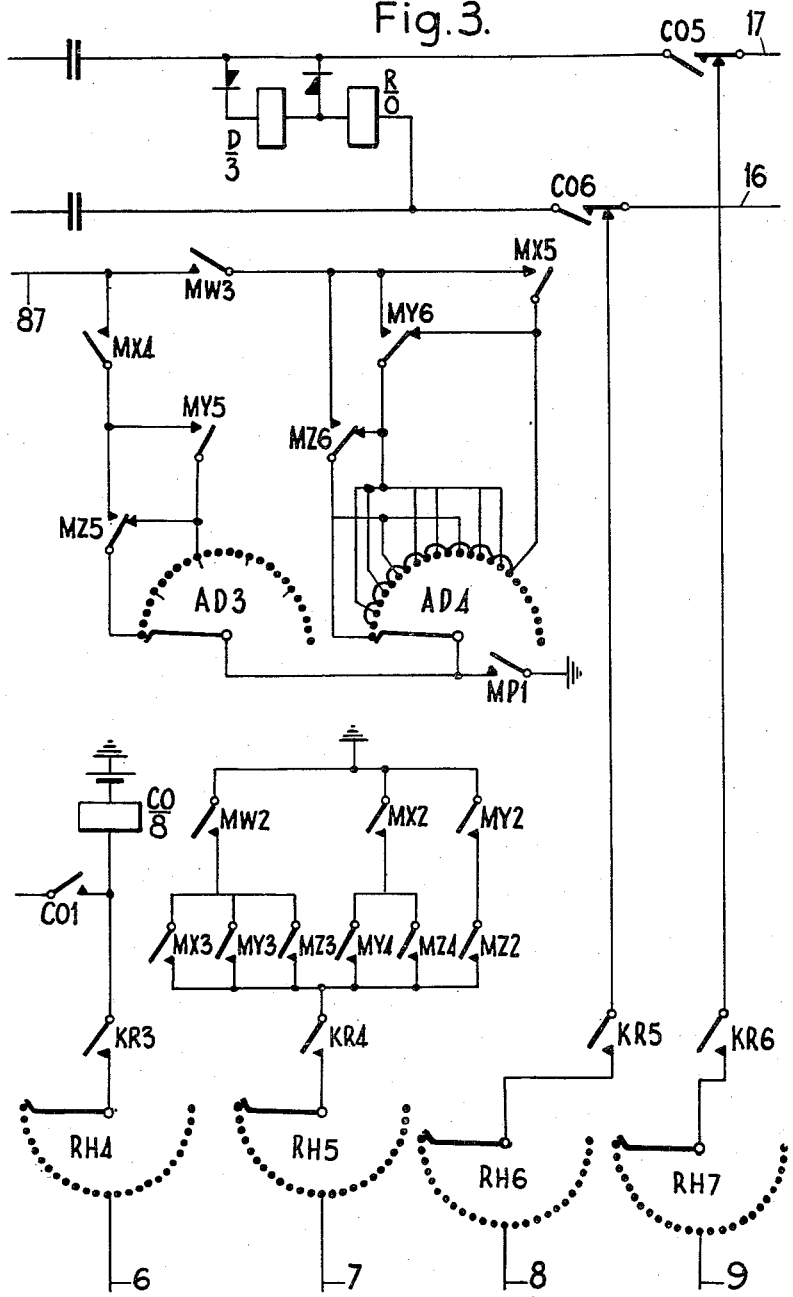
Figure 4:
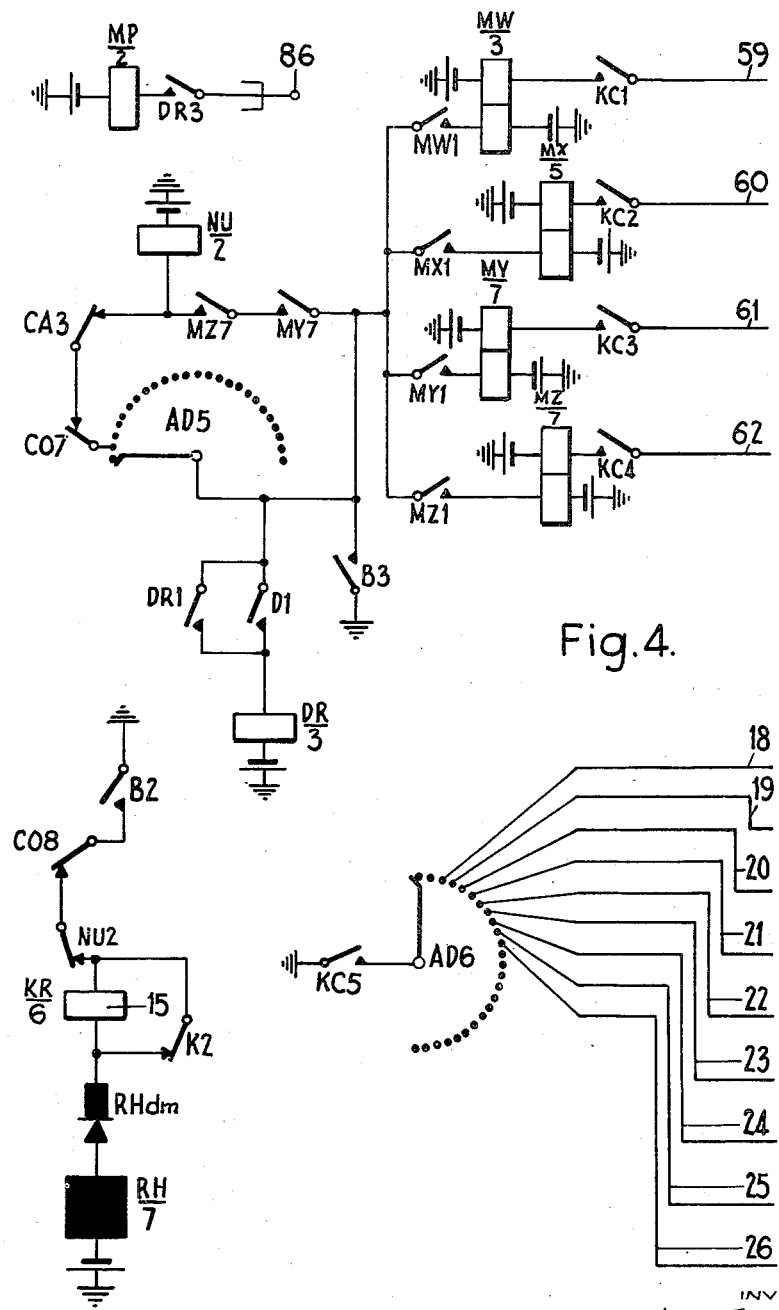
Figure 5:
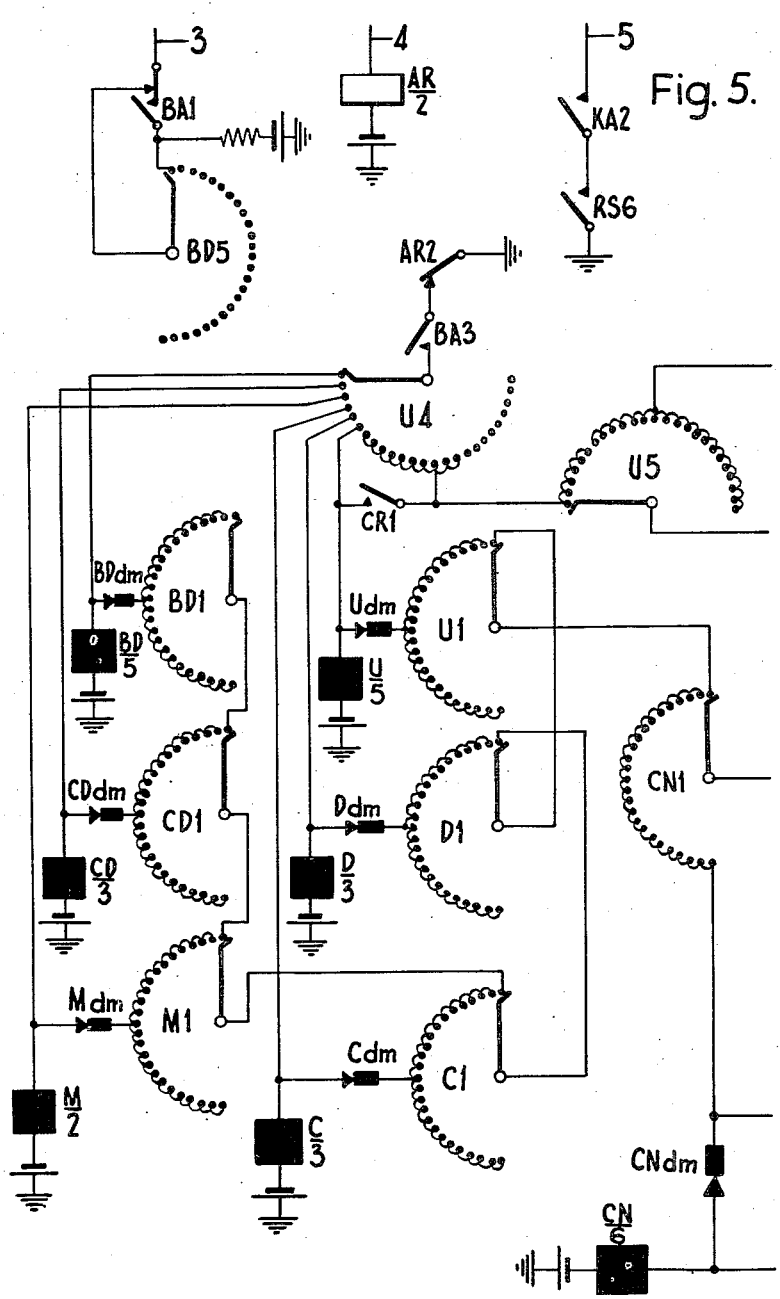
Figure 7:
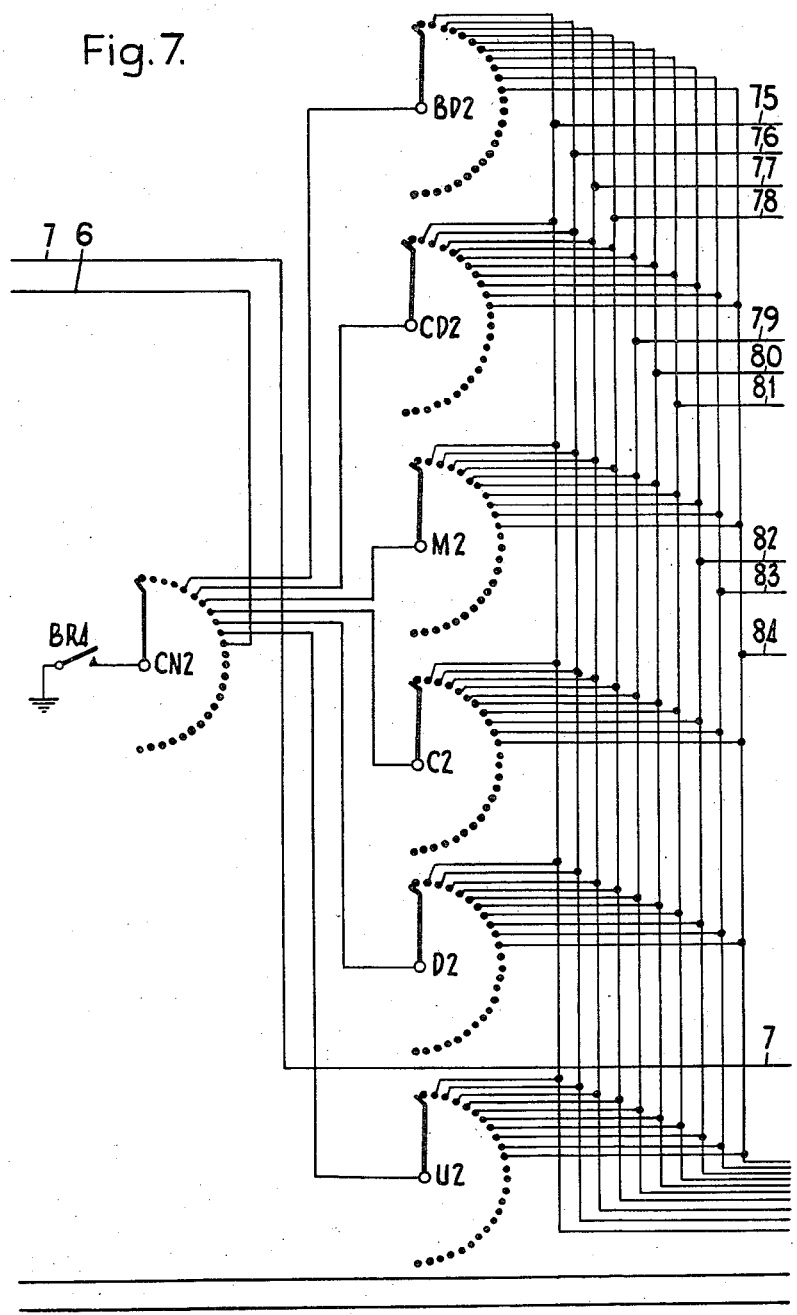
Figure 8:
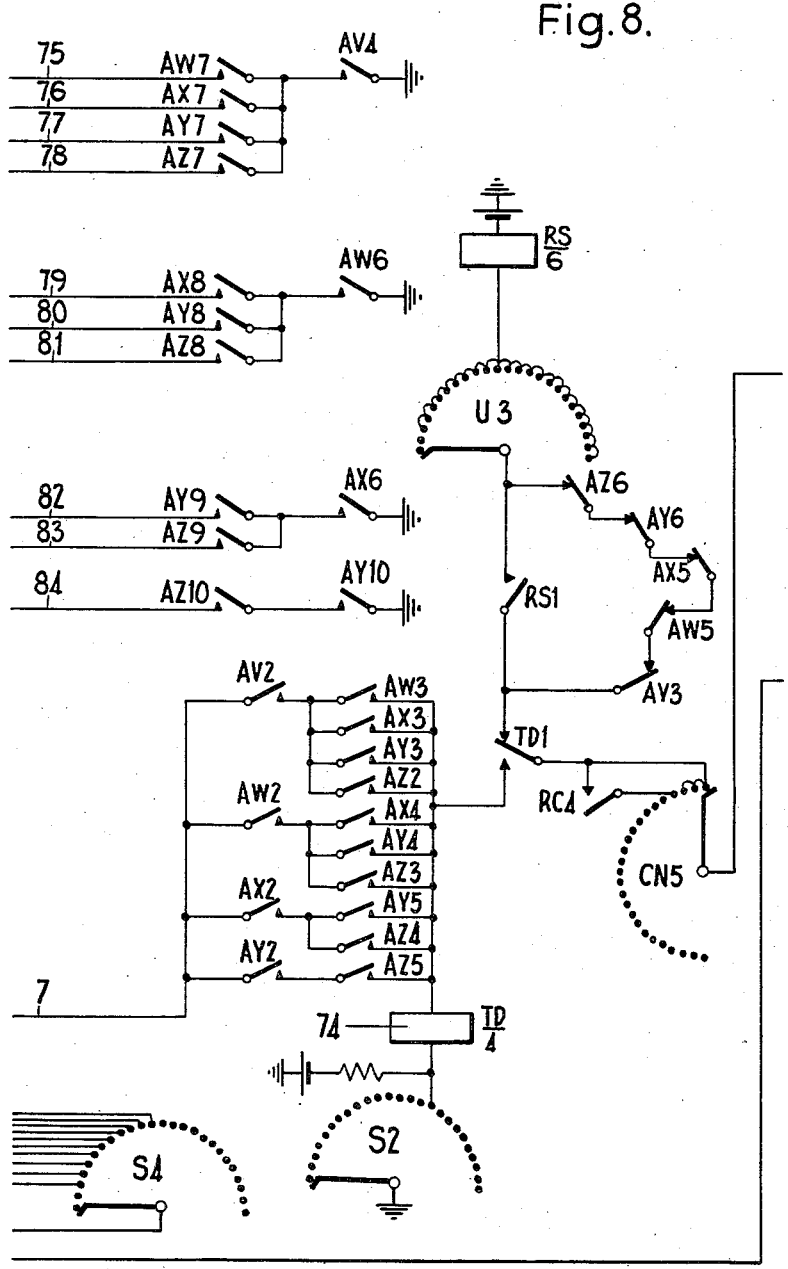
Figure 9:
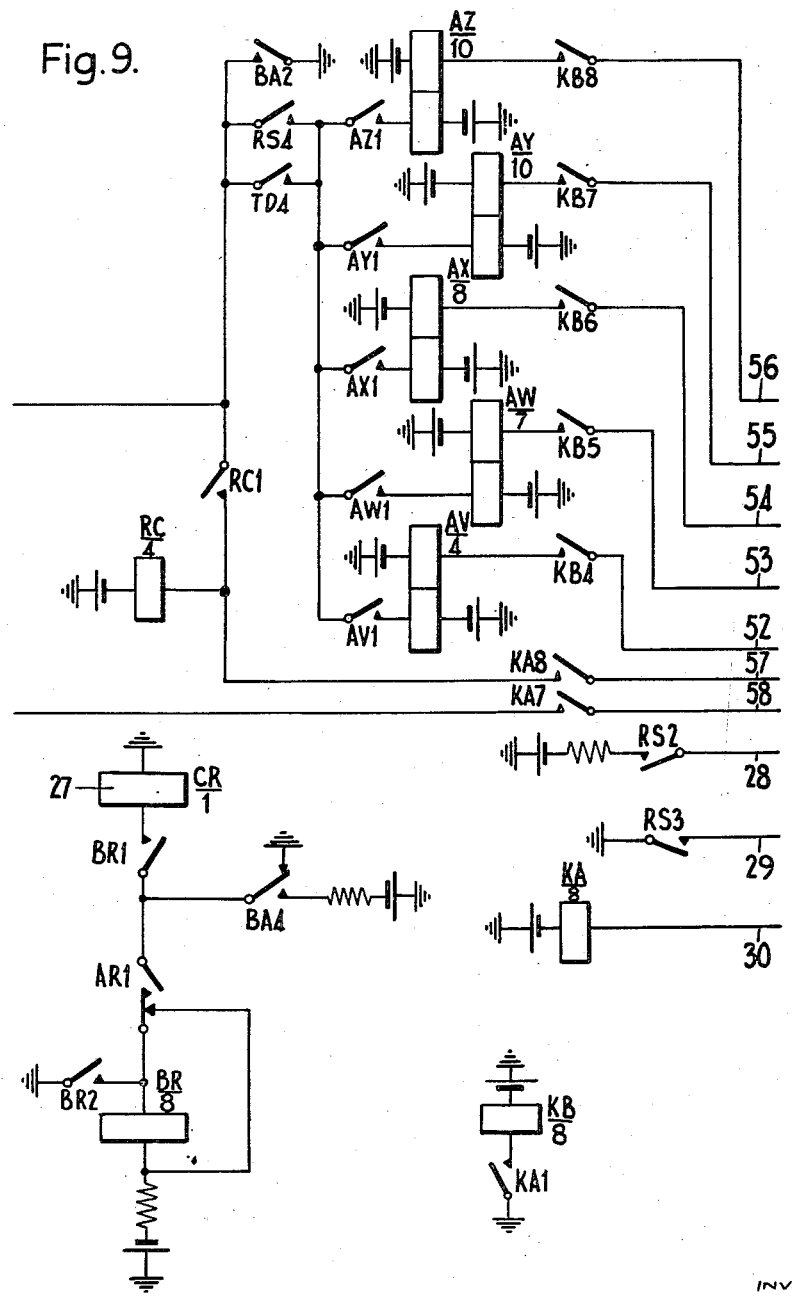
Figure 10:
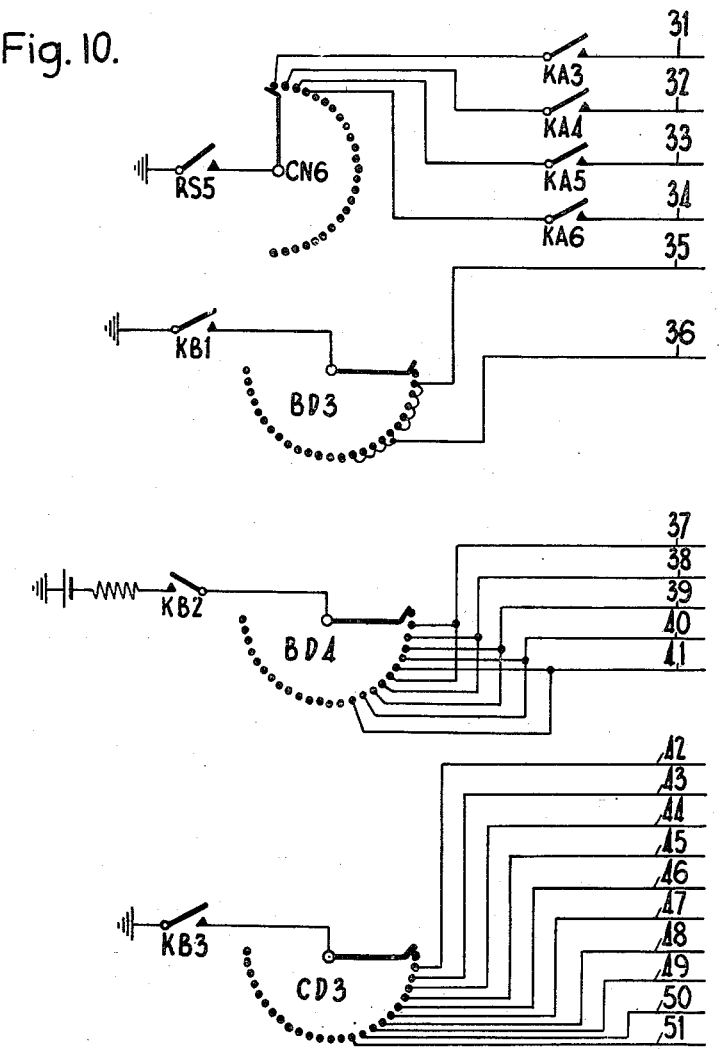
Figure 11:
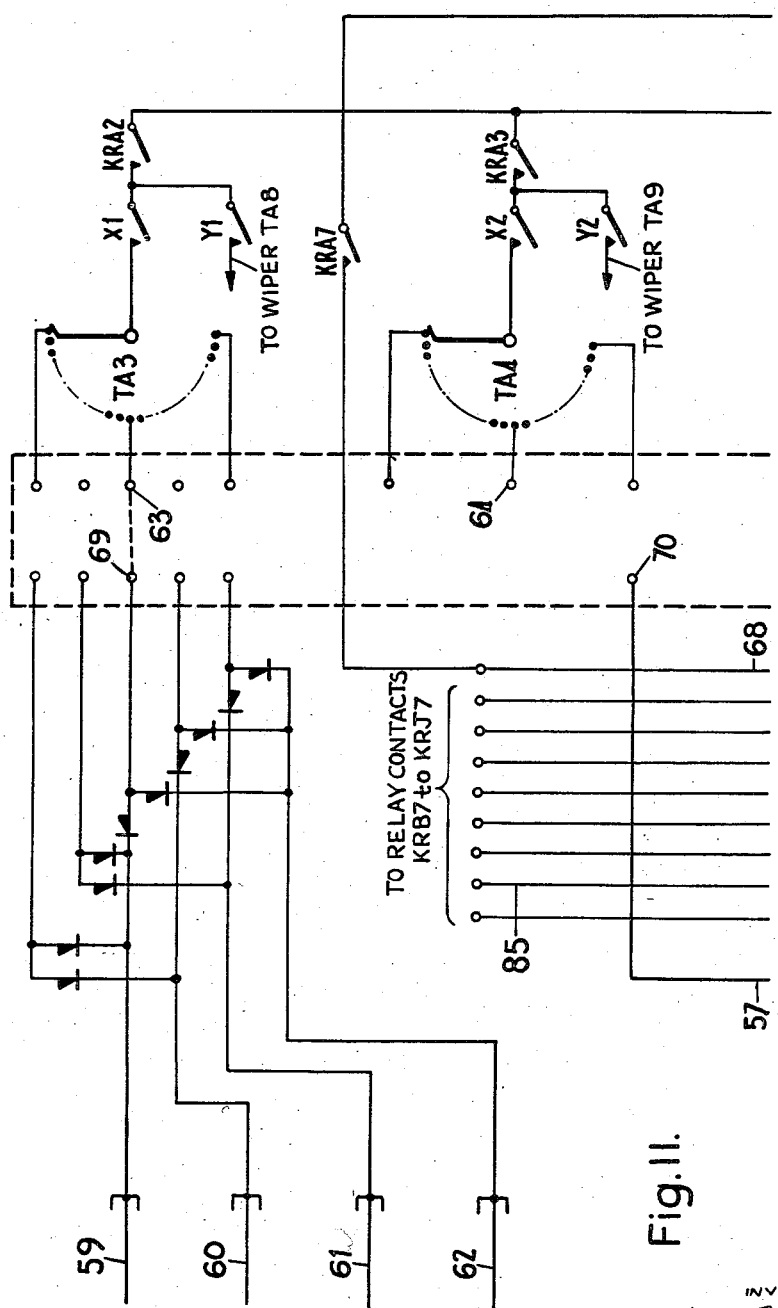
Figure 12:
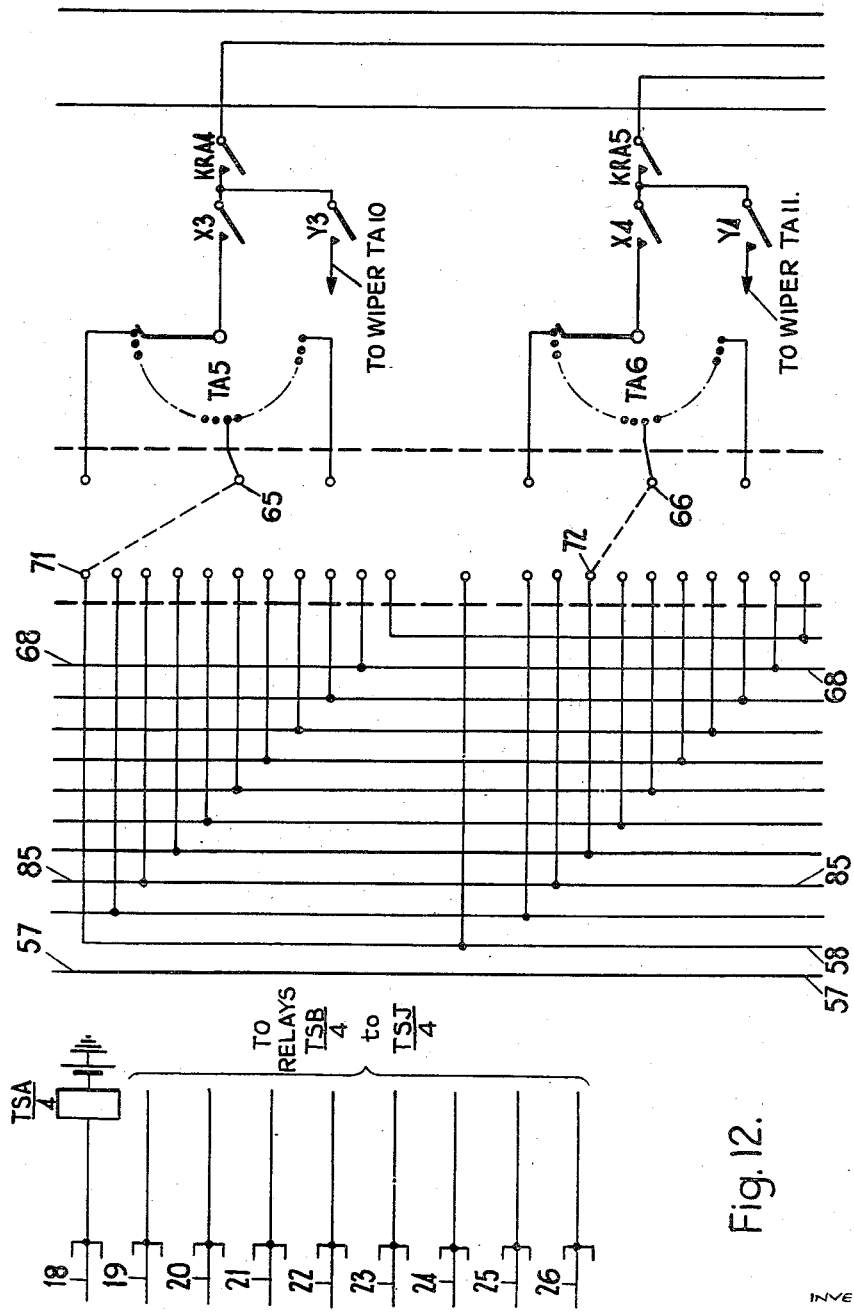
Figure 13:
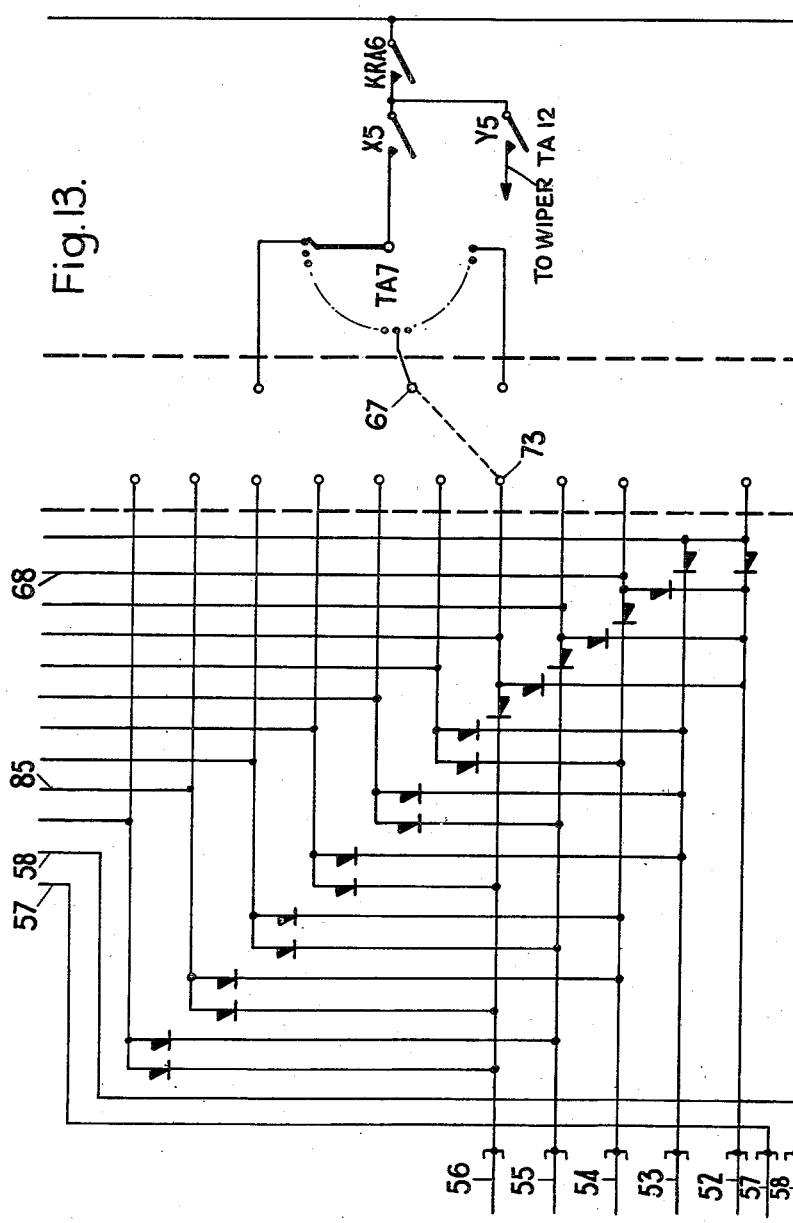
Figure 14:
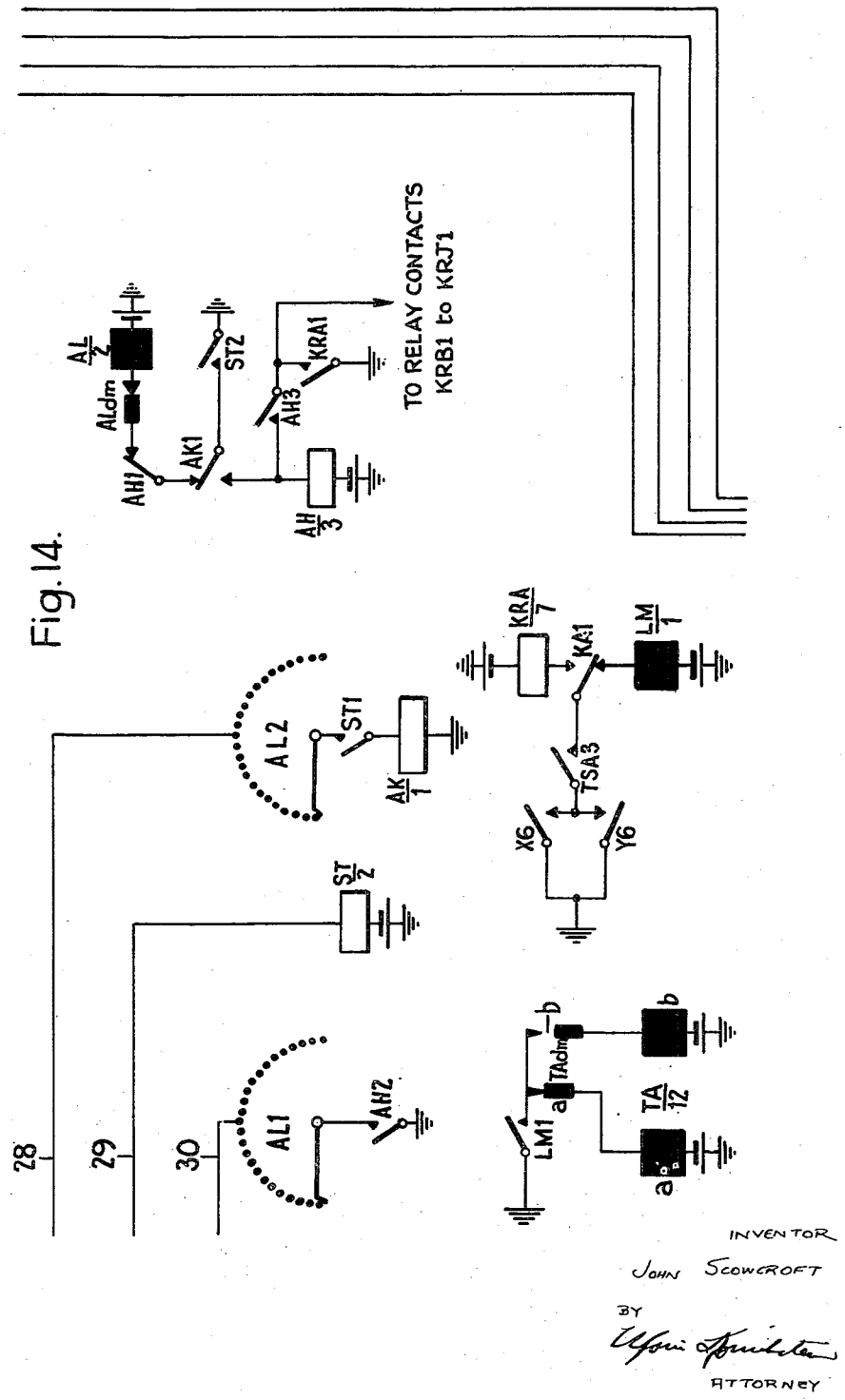
Figure 15:
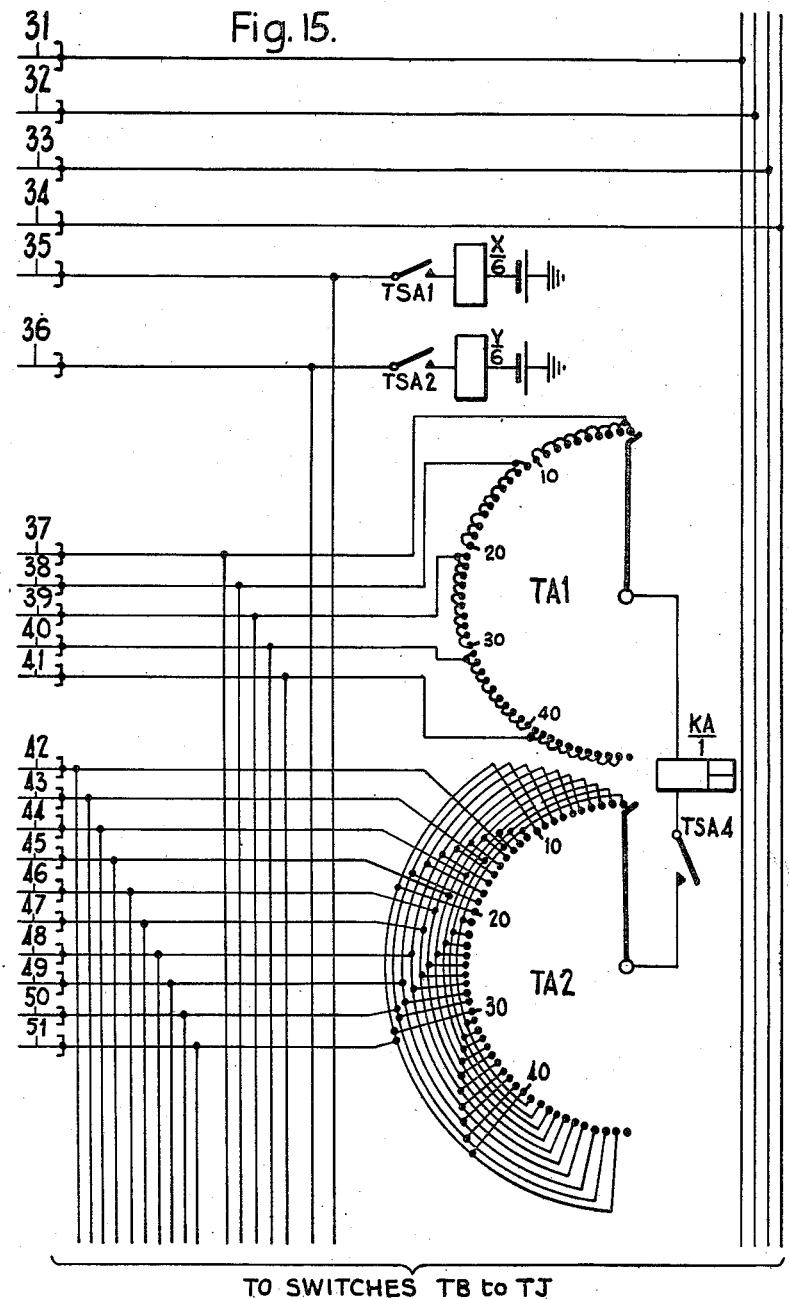
Figure 16:
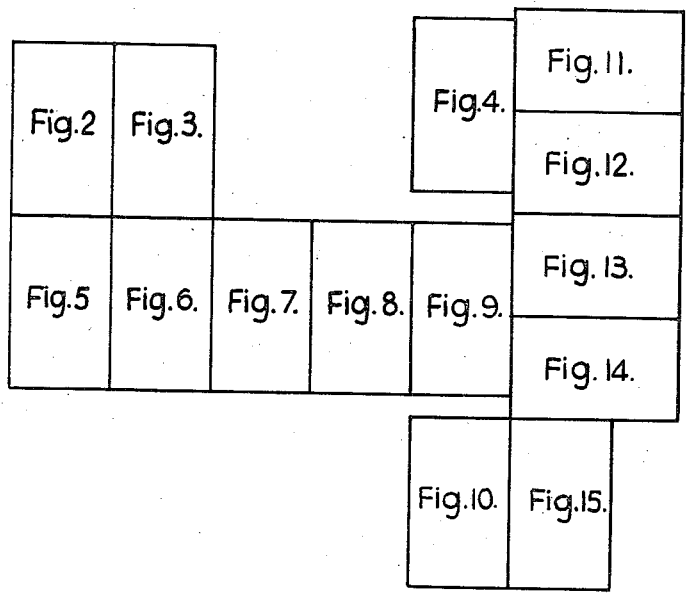

One arrangement of part of an automatic telephone exchange in accordance with the invention will now be described, by way of example, with reference to the sixteen figures of the accompanying diagrammatic drawings in which:

Figure 1 is a schematic diagram of the arrangement,

Figures 2 to 4 are complementary illustrations of the electrical circuit of an apparatus group, Figures 5 to 10 are complementary ilustrations of the electrical circuit of a register, Figures 11 to 15 are complementary illustrations of part of the electrical circuit of the translator, and Figure 16 shows the manner in which Figures 2 to 15 should be arranged both to illustrate the electrical circuits of the individual units, that is the apparatus group, the register and part of the translator, and to illustrate the relationship between the electrical circuits of those units when employed in an arrangement according to the invention.

The arrangement comprises a plurality of apparatus groups, a lesser plurality of registers and a single translator and will be described in its application to automatic telephone systems. In this application the said arrangement is employed at an automatic telephone exchange to effect translation of the first three impulse trains of a series of electrical impulse trains when such a series is applied to any one of the said apparatus groups, there being up to ten impulses in each train. The impulse trains of such a series may be originated by means of a telephone dial at a telephone station that is connected to the said telephone exchange, each impulse train corresponding to a different dialled digit. The first three impulse trains correspond to the so-called routing digits, hereinafter referred to as the A, B and C digits, and represent a unique code that is characteristic of the objective telephone exchange to which the wanted telephone station is connected. The A, B and C digit impulse trains are translated with or without change in the number of impulses in each train and with or without change in the number of impulse trains. The impulse trains resulting from the translation are employed to effect switch setting so as to establish a signalling path over a predetermined route, whereafter the numerical digit impulse trains are transmitted unaltered over the predetermined route to the objective exchange where they set switches in known manner to select the wanted telephone station.

In order to differentiate between those calls which require translation facilities for their establishment and those which do not, it may be arranged that when a party at a telephone station requires to set up a call of the former kind he dials one or more prefix digits followed by the said A, B and C digits and the numerical digits of the wanted station telephone number.

Reference should now be made to Figure 1 of the drawings.

Let it be assumed that a single prefix digit is dialled by a calling party. The resulting impulse train is applied to a previously seized selector switch, as for example the two-co-ordinate electro-magnetic step-by-step switch 90 which is situated at the calling party's exchange. This impulse train causes the wipers of the seized switch to be stepped to a bank contact level, such as the first that is characteristic of the said prefix digit. The contacts of the said switch at the first bank contact level are connected to apparatus groups and the switch steps its wipers in known manner around these bank contacts until a free apparatus group, such as the apparatus group 91, is found. This apparatus group 91 is seized for use with the call.

Each of the said apparatus groups includes a step-by-step uniselector switch, hereinafter referred to as a register hunter switch, the bank contacts of which are associated with the registers. The seized apparatus group 91 causes its register hunter switch 92 to hunt for a free register such as the register 93 and to obtain access to that register when found. Difficulty may be experienced in completing both of the above switching operations before the calling party dials the said A digit. In order to overcome this difficulty the A digit impulse train is received on a further step-by-step uniselector switch 94, hereinafter referred to as the A digit switch, in the seized apparatus group 91. The said A digit switch 94 steps its wipers according to the number of impulses received thereby, so that the position of the switch wipers at the end of the A digit impulse train characterises the A digit. The said A digit switch 94 has a number of contact banks and connections 95 are taken from succeeding contact positions around one of these banks each connection being associated with a different one of the motor uniselector switches TA and TJ in the translator 99. With a telephone system, it is usual for an impulse train to comprise from one to ten impulses, so that up to ten such connections may be provided, the number employed being determined by the circuit requirements. Preferably no such connection is taken from the bank contact corresponding to a single impulse for the said A digit, faulty operation of the A digit switch resulting from a spurious impulse is then of no consequence. In the arrangement under consideration nine motor uniselector switches TA to TJ are employed in the translator 99, provision being thus made for A digit impulse trains of from two to ten impulses.

The B and C digit impulse trains are supplied to the seized register 93 by way of the register hunter switch 92 in the apparatus group 91 and are received by the register 93 on step-by-step uniselector switches, hereinafter referred to as the B digit and C digit switches respectively, the wipers of each of these switches being stepped according to the number of impulses in the respective impulse trains.

A step-by-step uniselector switch 96, hereinafter referred to as the allotter, is associated with the translator 99 and has its bank contacts connected to the registers. When the seized register 93 has received the B and C digit impulse trains it applies a start signal to the allotter by way of the lead 97. If then the allotter is not already in use with another call it steps its wipers to the bank contacts associated with the said register. Potentials of predetermined polarity are then applied to certain contacts of two of the contact banks of the particular motor uniselector switch, TA, say, in the translator, selected by the A digit switch. The contacts of the said contact banks to which these potentials are applied are characteristic of the B and C digit impulse trains respectively, and it is arranged that at only one position are the switch wipers associated with the said contact banks each in engagement with a bank contact to which the said potentials are applied. The remaining contact banks and associated wipers of the said motor uniselector switch TA may be divided into two groups, the selected group being determined by the number of impulses in the B digit impulse trains. Thus if the B digit impulse train comprises from one to five impulses, the first of the said groups is selected, the second group being selected for from six to ten impulses.

The motor uniselector switch TA drives its wipers around the contact banks until they reach the position marked by the said potentials whereupon signals are applied over the bank contacts and associated wipers of the selected group at that position to a distribution frame 98. The resulting output signals from the distribution frame 98 are received and recorded by the operation of electro-magnetic relays both in the register 93 and in the apparatus group 91, whereafter the translator 99 is released so as to be available for use with the setting up of another call.

Two alternative methods of operation will now be considered at this stage. In the first method the signals received from the translator 99 represent the complete translation. The said signals are received by several groups of electromagnetic relays in the seized register 93 and by a single group of electro-magnetic relays in the seized apparatus group 91. The relays operated in each group in the register 93 characterise a different impulse train of the route code and act to cause transmission of that impulse train in correct sequence relative to the other impulse train of the route code to the junction or the code selector that is connected by way of the line 100 to the seized apparatus group 91. The relays of the group in the apparatus group 91 that are operated characterise the fee rate to be charged for the call and act to cause the calling subscriber's meter to be operated accordingly during the call.

In the second method, to be hereinafter described in more detail, one group of relays is provided in each register and one group in each apparatus group. The function of the latter group is as described above. The relays operated in the former group of the seized register 93 at this stage characterise the first impulse train of the route code and act to cause transmission of this train over the line 100. Subsequent to this transmission a suitable interval is allowed to enable the said first impulse train to effect its switching operation. After this interval, the register 93 and the apparatus group 91 again obtain access to the translator 99 in the manner previously described and the translator 99 supplies further signals to the said register 93 that are characteristic of the second impulse train of the route code. This process is repeated until all the impulse trains of the route code have been transmitted over the line 100 and the required signalling path has been established.

The impulse train corresponding to the numerical digit of the wanted party's telephone number are stored throughout the above operations on step-by-step uniselector switches in the register 93. After an interval in time sufficient for the impulse trains of the route code to have extended the signalling path to the objective telephone exchange, the numerical impulse trains are transmitted over the said path whereafter the register 93 is released. The apparatus group 91 is held operated throughout the duration of the call.

When the distance between the exchange of the calling party and that of the wanted party is great, one or more further signal translating processes such as that described above may be necessary at intermediate points along the speech path. Provision may be made such that when a call is of this nature the original A, B and C digit impulse trains are re-transmitted after the route code and before the numerical digit impulse trains.

The arrangement described above will now be described in more detail with reference to Figures 2 to 16 of the accompanying drawings.

The apparatus group shown in Figures 2 to 4 comprises a register hunter switch having seven contact banks and associated wipers RH1 to RH7, the A digit switch having six contact banks and associated wipers AD2 to AD6 and a plurality of electro-magnetic relays. The apparatus group may be seized for use with a call by looping the line wires 1 and 2. When this occurs the windings 88 and 89 of the relay A are energised in series from the negative battery at the winding 89 to earth at the winding 88 by way of the calling loop so that the relay A operates.

On the relay A operating the contacts A1 complete a circuit to operate the relay B and the contacts A2 prepare a circuit to apply earth to the lead 4 by way of the wiper RH2.

On the relay B operating the contacts B1 complete an alternative circuit between the negative battery 10 and the lead 11 ready for the subsequent stepping of the wiper AD1. The contacts B2 complete a circuit to energise the register hunter switch driving magnet RH. The contacts B3 prepare operating circuits for each of the relays DR, NU, MW, MX, MY and MZ. The contacts B4 prepare an impulsing circuit for the driving magnet AD of the A digit switch. The contacts B5 disconnect the wiper homing circuit of the driving magnet AD. The contacts B6 complete an energising circuit for the winding 90 of the relay CA. The contacts B7 prepare a holding circuit for the relay CO and the contacts B8 connect the operating windings 12 and 13 of the relay K which are in series with one another in series with the wiper RH1.

On the relay CA operating the contacts CA1 further prepare the impulsing circuit for the driving magnet AD. The contacts CA2 prepare an alternative circuit to apply earth to the wiper RH2 so as to prevent signalling over this wiper during the subsequent impulsing of the relay A and the contacts CA3 prevent the relay NU from operating when the wiper AD5 moves to its second bank contact.

The register hunter driving magnet RH steps the wipers RH1 to RH7 by self interruption of its energising circuit over the associated interrupter contacts RHdm. When the wiper RH1 reaches a contact of its associated bank that is connected to a free register the relay K operates in the manner hereinafter described. Let it be assumed that the register that is associated with the leads 3 to 9 and which is shown in Figures 5 to 10 to be free, that is not already in use with another apparatus group. This condition is indicated by the presence of negative voltage on the lead 3, so that when the wiper RH1 steps to the bank contact to which the lead 3 is connected it completes a circuit to energise the windings 12 and 13 of the relay K in series.

On the relay K operating the contacts K1 complete a short circuit across the operating winding 12 of this relay so as to increase the current flowing through the other operating winding 13. The negative voltage on the lead 3 consequently falls since the battery from which this voltage is derived is connected to the lead 3 by way of resistance. Such an arrangement is hereinafter referred to as negative resistance battery, the battery 10 and resistor 14 in series being a typical example. The fall in voltage on the lead 3 prevents the seized register from being taken into use with another apparatus group. The contacts K2 open and remove the short circuit from the operating winding 15 of the relay KR which therefore operates. The resistance of this operating winding 15 is such that the driving magnet RH does not receive sufficient current to operate further.

On the relay KR operating the contacts KR1 connect earth to the lead 4. The contacts KR2 extend the operating circuit of the relay KC to the lead 5. The contacts KR3 extend the operating circuit of the relay CO to the lead 6. The contacts KR4 have no function at this stage and the contacts KR5 and KR6 extend the leads 8 and 9 through to the outgoing line wires 16 and 17.

The leads 8 and 9 are connected together in the seized register so that a short circuit is applied across the line wires 16 and 17, that is the outgoing line from the seized apparatus group is looped. The line wires 16 and 17 may be connected to a junction, that is a circuit directly connecting the exchange of the apparatus group to another telephone exchange or alternatively to a selector switch whereby access is obtained to a junction. This selector switch, when provided, may be set by the first of the route code impulse trains. In either case it is arranged that the looping of the line wires 16 and 17 results in the application of positive and negative line potentials respectively to the said line wires in a similar manner to that described above in connection with the seizure of the apparatus group.

On application of the A digit impulse train to the positive and negative line wires 1 and 2, the relay A responds accordingly by releasing for the duration of each impulse.

On each release of the relay A the contacts A1 open and break the operating circuit of the relay B. The relay B is of the slow to release kind so that it holds operated throughout impulsing. The contacts A2 complete an energising circuit for the driving magnet AD. The wipers AD1 to AD6 are thus stepped around their respective contact banks one contact position for each impulse of A digit impulse train.

In moving off its first bank contact the wiper AD2 breaks the energising circuit of winding 90 of the relay CA. This relay is however of the slow release kind so that it holds operated, its other winding 91 being energised in series with the driving magnet AD during impulsing. The wiper AD6 prepares a circuit to apply earth over the appropriate one of the leads 18 to 26, each of these leads being associated with a different motor uniselector switch in the translator.

The remaining wipers AD1 and AD3 to AD5 have no function at this stage.

On the relay CA releasing the contacts CA1 break the energising circuit of the driving magnet AD. The contacts CA2 open and prepare for subsequent impulsing to the seized register over the lead 4. The contacts CA3 have no function at this stage.

The A digit impulse train has thus been received by the seized apparatus group which has in the meantime obtained access to the register shown in Figures 5 to 10.

Referring now to Figures 5 to 10 the register there shown comprises a B digit switch having five contact banks and associated wipers BD1 to BD5, a C digit switch having three contact banks and associated wipers CD1 to CD3, four uniselector switches, whereby the four numerical digits of the wanted party's telephone number are stored during translation, the wipers of these switches being referenced M, C, D and U respectively, two further uniselector switches having wipers S1 to S5 and CN1 to CN6 respectively and a plurality of electro-magnetic relays.

When this register is taken into use by the said apparatus group the relay AR operates the lead 4 being at earth potential.

On the relay AR operating the contacts AR1 complete a circuit to operate relay BR and the contacts AR2 prepare an impulsing circuit for the B digit switch driving magnet BD.

On the relay BR operating the contacts BR1 prepare a circuit to operate the relay CR. The contacts BR2 complete a circuit to hold the relay BR operated. The contacts BR3, BR4 and BR6 have no function at this stage. The contacts BR5 complete a circuit to operate the relay BA. The contacts BR 7 prepare a circuit to energise the driving magnet CN and the contacts BR8 disconnect the wiper homing circuit of each of the driving magnets BD, CD, M, C, D and U.

On the relay BA operating the contacts BA1 maintain the circuit for negative resistance battery to the lead 3 ready for the wiper BD5 to move off its first bank contact. The contacts BA2 prepare a circuit to operate the relay RS. The contacts BA3 further prepare an energising circuit for the driving magnet BD and the contacts BA4 prepare a circuit to operate the relay CR ready for the subsequent release of the relay AR.

On application of the B digit impulse train to the line wires 1 and 2 of the apparatus group, the relay A releases for each impulse and the contacts A2 break the operating circuit of the relay AR in the register. The relay AR thus responds to each impulse of the B digit impulse train by releasing momentarily.

On each release of the relay AR the contacts AR1 complete an energising circuit for the winding 27 of the relay CR and the contacts AR2 complete an energising circuit for the driving magnet BD.

On each intervening operation of the relay AR the contacts AR1 apply a short circuit to the winding 27 of the relay CR. This winding 27 is of high resistance so that after the relay CR operates on the first release of the relay AR, it holds operated throughout the subsequent impulsing. The contacts AR2 break the energising circuit of the driving magnet BD so that the wipers BD1 to BD5 are stepped around their contact banks one contact for each impulse in the B digit impulse train.

On the relay CR operating the contacts CR1 complete an energising circuit for the driving magnet U.

After the termination of impulsing the relay CR releases and the contacts CR1 break the energising circuit of the driving magnet U. Each of the switch wipers U1 to U5 is thus stepped to the second contact of its respective bank.

The wipers BD1 to BD5 have no function at this stage.

The wiper U4 prepares an energising circuit for the driving magnet CD ready for the C digit impulse train. The wipers U1 to U3 and U5 have no function at this stage.

The relay AR responds to each impulse of the C digit impulse train in the manner described above. The wipers CD1 to CD3 of the C digit switch are thus stepped around their contact banks one contact for each impulse of the said train. The relay CR operates at the commencement of impulsing its contacts CR1 completing an energising circuit for the driving magnet U. On the relay CR releasing at the end of impulsing the driving magnet U releases and each of the switch wipers U1 to U5 is stepped to its third bank contact.

The wipers CD1 to CD3 have no function at this stage. The wipers U1 to U2 have no function at this stage. The wipers U3 complete a circuit to operate the relay RS.

On the relay RS operating the contacts RS1 complete an alternative circuit to hold the relay RS operated. The contacts RS2 connect negative resistance battery to the lead 28. The contacts RS3 connect earth to the lead 29 and the contacts RS4, RS5 and RS6 have no function at this stage.

Each of the impulse trains corresponding to the numerical digits of the wanted subscriber's telephone number are received by the register in the manner previously described in connection with the B and C digit impulse trains.

The first of the numerical digit impulse trains steps the switch wipers M1 to M2 around their associated contact bank, each of the wipers U1 to U5 being thereafter stepped to the fourth contact of its associated bank. Similarly the second and third numerical digit trains step the switch wipers C1 to C3 and the wipers D1 to D3 respectively while each of the wipers U1 to U5 is stepped to the fifth and then the sixth contact of its associated bank. The impulses of the last numerical digit train steps each of the wipers U1 to U5 around its associated contact bank starting from the sixth bank contact in each case.

As previously described, negative resistance battery and earth are applied to the leads 28 and 29 at the termination of C digit impulse train. These leads 28 and 29 together with the lead 30 are connected to the allotter switch shown in Figure 14 and reference should now be made to this figure.

The relay ST operates to earth on the lead 29.

On the relay ST operating the contacts ST1 prepare an operating circuit for the relay AK and the contacts ST2 complete an energising circuit for the allotter switch driving magnet AL by way of the associated interrupter contacts AL*dm*. The wipers AL1 and AL2 are therefore stepped by self interruption of the driving magnet AL energising circuit until the wiper AL2 reaches the bank contact to which the lead 28 is connected. On the wiper AL2 reaching this contact the relay AK operates from the negative potential on the lead 28. On the relay AK operating the contacts AK1 break the energising circuit of the driving magnet AL and so prevent further stepping of the switch wipers AL1 and AL2. The contacts AK1 also complete a circuit to operate the relay AH.

On the relay AH operating the contacts AH1 further disconnect the energising circuit of the driving magnet AL. The contacts AH2 connect earth to the lead 30 so that the relay KA in the register operates, and the contacts AH3 prepare a circuit to hold the relay AH operated.

In the register (Figures 5 to 10): On the relay KA operating the contacts KA1 complete a circuit to operate the relay KB. The contacts KA2 connect earth to the lead 5 and so complete a circuit to operate the relay KC in the apparatus group. The contacts KA3 connect earth to the lead 31 which is connected, together with the leads 32, 33 and 34, to the translator. The contacts KA4 to KA8 have no function at this stage.

On the relay KB operating the contacts KB1 connect earth to the switch wiper BD3 and thence by way of one of the leads 35 or 36 to the translator. Assuming the B digit impulse train to have comprised from one to five impulses, then the said connection is by way of the lead 35. The contacts KB2 connect negative resistance battery to the appropriate one of the leads 37 to 41 the lead 39 say, as determined by the B digit impulse train and hence by the position of the wiper BD4. The contacts KB3 connect earth to the appropriate one of the leads 42 to 51, the lead 50 say, as determined by the C digit impulse train and hence by the position of the wiper CD3. The contacts KB4 to KB8 prepare circuits for the relays AV, AW, AX, AY and AZ ready for the subsequent application of signals from the translator over the leads 52 to 56 respectively such signals characterising the various impulse trains of the translation.

On the operation of the relay KC in the apparatus group (Figures 2 to 4) the contacts KC1 to KC4 prepare operating circuits for the relay MW, MX, MY and MZ ready for the subsequent application of signals from the translator over the leads 59 to 62 respectively, such signals characterising the fee rate to be charged for the call. The contacts KC5 connect earth to the appropriate one of the leads 18 to 26, such as the lead 18, as determined by the A digit impulse train and hence by the position of the switch wiper AD6. As previously described, the leads 18 to 28 are associated each with a different motor uniselector switch in the translator.

By applying earth to the lead 18, the motor uniselector switch TA that is associated with that lead is selected. The electrical circuit of the switch TA is shown in Figures 11 to 15, and reference should now be made to these figures. The motor uniselector switch TA has twelve wipers TA1 to TA12 of which the wipers TA3 to TA6 are employed during a translation process when the B digit impulse train comprises from one to five impulses and the wipers TA7 to TA12 (not shown) are similarly employed when the said impulse train comprises from six to ten impulses.

The electro-magnetic relays X and Y act when operated to determine which set of wipers TA3 to TA6 or TA7 to TA12 are employed for a translation.

Each contact bank of the said motor switch TA comprises fifty-one contacts, connections being taken from at least some of the bank contacts that are associated with the wipers TA3 to TA12 to one side of a distribution frame. Connections are taken from the other side of this frame to each of the registers by way of leads such as the leads 52 to 58 and to each of the apparatus groups by way of leads such as the leads 59 to 62.

The use in telephone systems of frames of this kind is well known. Such a frame usually comprises a metal framework having banks of terminals mounted on two opposite sides. These terminals are usually marked so as to designate the connection made thereto and to readily facilitate cross connections as required between the various terminals on opposite sides of the frame.

Assuming the A digit impulse train to have comprised two impulses, then earth is applied to the lead 18 from the seized apparatus group. On the relay TSA operating the contacts TSA1 prepare a circuit to operate the relay X. The contacts TSA2 prepare a circuit to operate the relay Y. The contacts TSA3 prepare a circuit to energise the motor switch latch magnet LM and the contacts TSA4 prepare a circuit to operate the high speed relay KA.

Let it be assumed that the lead 39 is connected to negative resistance battery in the register over the B digit switch wiper BD4 and that the lead 50 is connected to earth in the register over the C digit switch wiper CD3, these two conditions corresponding to B and C digit impulse trains comprising three and nine impulses respectively. The lead 39 is connected to contacts twenty-one to thirty of the contact bank that is associated with the wiper TA1 and the lead 50 is connected to contact nine, nineteen, twenty-nine, thirty-nine and forty-nine of the contact bank that is associated with the wiper TA2. Thus the relay KA can only operate from the potentials on the leads 39 and 50 when the wipers of the switch TA and in particular the wipers TA1 and TA2 are positioned on the twenty-ninth contacts of their associated banks.

In addition to the conditions assumed above, the leads 31 and 35 are connected to earth in the register over the switch wiper CN6 and the B digit switch wiper BD3 respectively. In consequence of the latter condition the relay X will operate.

On the relay X operating the contacts X1 to X5 select the switch wipers TA3 to TA7 respectively and the contacts X6 complete a circuit to energise the latch magnet LM. This magnet LM acts when energized to disengage a latch from the driving mechanism of the motor switch TA, and to close the associated contacts LM1.

On the latch magnet LM being energised the said latch is disengaged and the contacts LM1 complete a circuit for the motor switch driving magnets TAa and TAb by way of the associated interrupter contacts TAdm(a) and TAdm(b).

The switch wipers TA1 to TA12 are thus driven around their associated contact banks until they reach the twenty-ninth contact whereupon the high speed relay KA operates in the manner described above.

On the relay KA operating the contacts KA1 break the energising circuit of the latch magnet LM so that the latch engages with the motor switch driving mechanism and prevents further rotation of the wipers TA1 to TA12. The contacts KA1 also complete a circuit to operate the relay KRA. The contacts LM1 open and break the electrical circuit for the motor switch driving mechanism.

On the relay KRA operating the contacts KRA1 complete a circuit to hold the relay AH operated. The contacts KRA2 extend the connection from the lead 31, which is at earth potential, to the terminal 63 on the distribution frame by way of the wiper TA3. The contacts KRA3 extend the connection from the lead 31 to the terminal 64 on the distribution frame by way of the wiper TA4. The contacts KRA4 extend the connection from the lead 33 to the terminal 65 on the distribution frame by way of the wiper TA5. The contacts KRA5 extend the connection from the lead 32 to the terminal 66 on the distribution frame by way of the wiper TA6. The contacts KRA6 extend the connection from the lead 31 to the terminal 67 on the distribution frame by way of the wiper TA7, and the contacts KRA7 extend the connection from the lead 34 to the lead 68.

Let it be assumed that the terminals 63 and 65 to 67 are connected as shown by the broken lines to the terminals 69 and 71 to 73 respectively of the distribution frame. The connection between the terminals 63 and 69 completes an operating circuit for each of the relays MW and MZ in the apparatus group by way of the leads 59 and 62 respectively.

The connection between the terminals 67 and 73 completes an operating circuit for each of the relays AV and AZ in the register by way of the leads 52 and 56. The connections between the terminals 65 and 71 and the terminals 66 and 72 have no function at this stage.

If the nature of the call as indicated by the A, B and C digit impulse trains is such as to require one or more further signal translation processes in order to establish a connection to the telephone exchange of the wanted subscriber the terminals 64 and 70 are connected together, thereby completing a circuit to operate the relay RC in the register. The operation of the relay RC results in the A, B and C digit impulse trains being retransmitted after the routing digit in the manner to be described hereinafter.

On the relays MW and MZ operating in the apparatus group the contacts MW1 complete a circuit to hold the relay MW operated. The contacts MW2 act in conjunction with the contacts MZ3 to connect earth to the lead 7 and the contacts MW3 have no function at this stage. The contacts MZ1 complete a circuit to hold the relay MZ operated. The contacts MZ2, MZ4 and MZ5 to MZ7 have no function at this stage.

On the relays AV and AZ operating on the register the contacts AV1 complete a circuit to hold the relay AV operated. The contacts AV2 act in conjunction with the contacts AZ2 to connect the lead 7 which is at earth potential to negative resistance battery by way of the operating winding 74 of the relay TD. The contacts AV3 have no function at this stage. The contacts AV4 act in conjunction with the contacts AZ7 to connect earth to the lead 78. The contacts AZ1 complete a circuit to hold the relay AZ operated and the contacts AZ2 and AZ7 fulfil the function described above. The remaining contacts of the relay AZ have no function at this stage.

On the relay TD operating the contacts TD1 break the operating circuit of the relay RS and complete an alternative circuit to hold the relay TD operated over the wiper CN5. The contacts TD2 have no function at this stage. The contacts TD3 complete a circuit to operate the relay P and the contacts TD4 complete an alternative circuit to hold the relays AV and AZ operated upon the release of the relay RS and the consequent opening of the contacts RS4.

On the relay RS releasing the contacts RS1 have no function at this stage. The contacts RS2 disconnect negative resistance battery from the lead 28 so that the relay AK releases in the allotter. The contacts RS3 disconnect earth from the lead 29 so that the relay ST releases in the allotter. The contacts RS4 have no function at this stage. The contacts RS5 disconnect earth from the wiper CN6 and hence from the lead 31, and the contacts RS6 disconnect earth from the lead 5 so that the relay KC releases in the apparatus group.

In the apparatus group: On the relay KC releasing, the contacts KC1 to KC4 disconnect the apparatus group from the leads 59 to 62 and the contacts KC5 disconnect earth from the lead 18 so that the relay TSA releases in the translator.

In the translator: On the relay TSA releasing the contacts TSA1 break the operating circuit of the relay X. The contacts TSA2 have no function at this stage. The contacts TSA3 break the operating circuit of the relay KRA and the contacts TSA4 break the operating circuit of the high speed relay KA.

On the relay KRA releasing the contacts KRA1 break the operating circuit of the relay AH in the allotter. The remaining contacts of this relay have no function at this stage.

On the relay X releasing the contacts X1 to X6 have no function at this stage.

On the high speed relay KA releasing the contacts KA1 have no function at this stage.

On the relay AH releasing in the allotter the contacts AH1 prepare the circuit of the allotter switch driving magnet AL for subsequent use and the contacts AH2 disconnect earth from the lead 30 so that the relay KA releases in the register.

On the relay KA in the register releasing the contacts KA1 break the operating circuit of the relay KB. The remaining contacts KA2 to KA8 of this relay have no function at this stage. On the relay KB releasing the contacts KB1 disconnect earth from the lead 35 (or 36). The contacts KB2 and KB3 disconnect negative resistance battery and earth from the leads 39 and 50 respectively. The remaining contacts KB4 to KB8 of this relay have no function at this stage.

The translator has now been released by the register and the apparatus group and is available for use in conjunction with another call.

Reverting now to the stage where the relay P was operated in the register: On the relay P operating the contacts P1 have no funciton at this stage due to the short circuit by way of the wiper S5. The contacts P2 complete a circuit to energise the driving magnet S and break the operating circuit of the relay P which releases, whereupon the contacts P2 break the energising circuit of the driving magnet S and make the operating circuit of the relay P.

The switch wipers S1 to S5 are thus stepped to their second bank contact. The wipers S1 and S2 have no function at this stage. The wiper S3 completes a circuit to energise the driving magnetic CN. The wiper S4 has no function at this stage, and the wiper S5 removes the short circuit from the relay contacts P1.

The relay P continues to operate and release, its contacts P1 impulsing the two line wires 16 and 17 by alternately breaking and making the loop across the leads 8 and 9. The contacts P2 alternately make and break the energising circuit of the driving magnet S which thus steps its wipers S1 to S5 one contact position for each impulse sent out.

The sixth contact of the bank associated with the wiper S4 is connected to the lead 78 this lead being connected to earth over the relay contacts AZ7 and AV4. When the wiper S4 reaches the sixth contact in its bank it completes a circuit to operate the relay SZ.

On the relay SZ operating the contacts SZ1 loop the leads 8 and 9 and so prevent further impulsing to the line wires 16 and 17. The contacts SZ2 open and break the operating circuit of the relay P. The contacts SZ3 complete a circuit by way of the wiper S3 to hold the relay SZ operated and break the energising circuit of the driving magnet CN, and the contacts SZ4 complete an energising circuit for the driving magnet S by way of the associated interrupter contacts Sdm and wiper S1.

On the release of the driving magnet CN the wipers CN1 to CN6 are stepped to the second contacts of their respective banks but have no function at this stage.

The wipers S1 to S5 continue to step around their associated banks until the wiper S1 engages with its sixteenth bank contact thereby breaking the energising circuit of the driving magnet S. At this position the wiper S2 applies its associated earth to the operating winding 74 of the relay TD. This operating winding 74 is thus short circuited so that the relay TD releases.

On the relay TD releasing the contacts TD1 have no function at this stage. The contacts TD2 complete an alternative circuit to operate the relay P to earth on the wiper S1. The contacts TD3 have no function at this stage, and the contacts TD4 break the circuit whereby the relays AV and AZ have been held operated. The relays AV and AZ therefore release.

The relay P alternately operates and releases, the contacts P2 acting to make and break the energising circuit of the driving magnet S. The wipers S1 to S5 are thus stepped to their last bank contact but one, whereafter the wiper S1 completes a self-drive circuit for the driving magnet S by way of the interrupter contacts Sdm and the wipers S1 to S5 are homed to their first bank contact. On reaching its first bank contact the wiper S2 breaks the operating circuit of the relay SZ which therefore releases but has no function at this stage.

On the relays AV and AZ releasing the contacts AV3 and AZ6 complete a circuit for the operation of the relay RS and the contacts AV4 and AZ7 disconnect earth from the lead 78.

The first impulse train of the route code has thus been transmitted over the line wires 16 and 17 and a suitable pause has been provided by the subsequent homing of the switch wipers S1 to S5 to their first bank contacts. The apparatus group and register now require access to the translator in order to obtain signals representative of the second impulse train of the route code.

On the relay RS operating, the contacts RS1 complete a circuit to hold the relay RS operated. The contacts RS2 and RS3 apply negative resistance battery and earth to the leads 28 and 29 respectively. If the translator is not already engaged with another call the allotter switch steps its wipers AL1 and AL2 to the bank contacts associated with the leads 28 and 30 in the manner previously described. The contacts RS4 have no function at this stage. The contacts RS5 prepare a circuit to connect earth over the wiper CN6 to the lead 32 and the contacts RS6 prepare a circuit to connect earth to the lead 5.

On the relay KA in the register operating the contacts KA1 complete a circuit to operate the relay KB. The contacts KA2 connect earth to the lead 5 so as to operate the relay KC in the apparatus group and the contacts KA4 connect earth to the lead 32 over the wiper CN6 which is now positioned on its second contact.

On the relay KB operating the contacts KB1 connect earth to the lead 35. The contacts KB2 connect negative resistance battery to the lead 39. The contacts KB3 connect earth to the lead 50 and the contacts KB4 to KB8 prepare circuits for the relays AV, AW, AX, AY, and AZ.

On the operation of the relay KC in the apparatus group the contacts KC1 to KC4 have no function at this stage. The contacts KC5 connect earth to the lead 18 thereby completing a circuit to operate the relay TSA in the translator.

The circuit operations in the translator are substantially as hereinbefore described inasmuch as the relays TSA and X operate, the motor switch TA drives the wipers TA1 to TA12 around their contact banks to the twenty-ninth contact position whereupon the relay KA operates followed by the operation of the relay KRA.

On the relay KRA operating the contacts KRA5 extend the connection from the lead 32 which is at earth potential to the terminal 66 of the distribution frame over the wiper TA6, and thence by way of the terminal 72 to the leads 54 and 55 so as to complete circuits for the operation of the relays AX and AY in the register.

On the relays AX and AY operating, the contacts AX1 and AY1 each complete a circuit to hold their respective relays AX and AY operated. The contacts AX2 and AY5 complete an energising circuit for the operating winding 74 of the relay TD, the lead 7 being at earth potential, and the contacts AX6 and AY9 connect earth to the lead 82.

The sequence of operations now proceeds substantially as hereinbefore described in connection with the transmission over the leads 8 and 9 to the line wires 16 and 17 of the first impulse train of the route code. Thus the translator and allotter are released and the relay P acts to step the switch wiper S1 to S5 around their banks and to impulse the line wires 16 and 17 until the wiper S4 engages the contact of its bank that is marked by the earth on the lead 82. Each of the wipers CN1 to CN6 is then stepped to the third contact of its associated bank, the wipers S1 to S5 are homed to their first bank contact and the relays AX and AY are released.

If the nature of the call is such that no further impulse trains are required for the route code the terminals 65 and 71 of the distribution frame in the translator are connected together. Assume the call under consideration to be of this kind. When the register and the apparatus group are next connected to the translator, the connection from the lead 33, which is at earth potential, is extended by way of the relay contacts KRA4 and X3, the wiper TA5 and the terminals 65 and 71 to the lead 58. The lead 58 is connected to the second and third contacts of the bank associated with the wiper CN4. The wiper CN4 is positioned on its third bank contact so that the driving magnet CN is energised by way of the associated interrupter contacts CN$dm$. Each of the wipers CN1 to CN6 is therefore stepped to its fourth bank contact. Two possibilities now arise. If the A, B and C digit impulse trains are to be repeated over the line wires 16 and 17 then the relay RC is operated. If however no such repetition is to be made, then the relay contacts RC3 are closed and the driving magnet CN steps each of the wipers CN1 to CN6 to its seventh bank contact. The circuit operations in either case are similar and the former will be considered here.

Assuming the relay RC to have been operated as a result of the initial seizure of the translator, then this relay is held operated over its contacts RC1. The fifth and sixth contacts of the bank associated with the wiper CN3 are connected to earth by way of the contacts RC2 and BR5. The contacts RC3 are open so that the wipers CN1 to CN6 are on their fourth bank contacts, and the contacts RC4 are closed thereby completing a circuit to operate the relay RS.

In the case under consideration the A digit impulse train was composed of two impulses, so that it is now required to impulse the line wires 16 and 17 twice by means of the relay contacts P1 in the register. This is effected in a similar manner to that previously described for the first and second impulse train of the route code, the required number of impulses being obtained by connecting earth to the appropriate contact of the bank associated with the wiper S4. Since two impulses are required the foutrh contact of the said bank must be thus marked. It is therefore necessary to operate the relays AV and AX, earth then being applied to the lead 76 over the contacts AV4 and AX7. The relays AV and AX are operated by connecting earth to the leads 52 and 54 in the following manner:

When the relay RS operates the contacts RS5 connect earth to the lead 34 by way of the wiper CN6. The remaining contacts of the relay RS fulfill the same functions as described above in connection with the two previous operations of this relay. The allotter and translator function as before and the relay contacts KRA7 in the translator extend the connection from the lead 34 to the lead 68, the lead 68 being connected in turn to the leads 52 and 54.

Had the A digit impulse train been composed of from three to ten impulses then the appropriate one of the motor uniselector switches TB to TJ and the relays associated therewith, would have been employed throughout the translating processes previously described. Thus for an A digit impulse train of nine impulses the motor switch TH would be employed so that at the stage under consideration the relay contacts KRH7 of the relay KRH (not shown) that is associated with the motor switch TH would have extended the connections from the lead 34 to the lead 85 and thence to the leads 54 and 56. The relays AX and AZ in the register would therefore have been operated and earth connected to the lead 83 over the contacts AX6 and AZ9 thereby applying a mark to the eleventh contact of the bank associated with the wiper S4.

The A digit impulse train having been retransmitted over the line wires 16 and 17, the allotter and translator are released, the switch wipers S1 to S5 are homed to their first bank contact and the switch wipers CN1 to CN6 are stepped to their fifth bank contact.

The B and C digit impulse trains and the four impulse trains corresponding to the numerical digits of the wanted subscriber's telephone number have been stored in the register so that no further information is required from the translator. It is now required to retransmit the B digit impulse train comprising three impulses. On each of the wipers CN1 to CN6 stepping to the fifth contact of its associated bank the wiper CN2 connects earth to the fourth contact of the bank associated with the wiper BD2 and thence to the fifth contact of the bank associated with the wiper S4. The wiper CN3 completes a circuit to operate the relay P. The wiper CN5 prevents further operation of the relay RS and the wipers CN1, CN4 and CN6 have no function at this stage.

The relay P impulses the line wires 16 and 17 and causes the driving magnet S to step its wipers S1 to S5 until the wiper S4 engages with the fifth contact of its bank by which time three impulses have been sent out. The relay SZ operates followed by the release of the driving magnet CN with the resultant stepping of the wipers CN1 to CN6 to their sixth contact. The wipers S1 to S5 are then homed whereupon the relay SZ releases in readiness for the outpulsing of the C digit impulse train. In moving to its sixth bank contact the wiper CN2 connects earth to the wiper CD2 and thence to a contact of the bank associated with the wiper S4. The contact thus marked is such that a train of impulses corresponding to the original C digit impulse train is outpulsed by the relay contacts P1 in the manner previously described. Similarly, impulse trains corresponding to the four numerical digits of the wanted subscriber's telephone number are outpulsed as a result of the wipers CN1 to CN6 being stepped to their seventh, eighth, ninth and tenth bank contacts respectively.

All the above impulse trains having been outpulsed, the wipers CN1 to CN6 are stepped to their eleventh bank contacts. When this occurs, earth on the wiper CN2 is applied over the lead 6 to the apparatus group so that the relay CO operates.

On the relay CO operating the contacts CO1 complete a circuit to hold this relay operated. The contacts CO2 complete a circuit to energise the driving magnet AD by way of the associated interrupter contacts AD*dm* so that the A digit switch homes its wipers to their first bank conduct. The contacts CO3 break the operating circuit of the relay K. The contacts CO4 prevent further operation of the relay CA. The contacts CO5 extend the calling subscriber's speech path to the line wires 16 and 17. The contacts CO7 prevent the relay NU from operating when the wipers AD1 to AD6 are subsequently stepped for call timing purposes, and the contacts CO8 prevent the driving magnet RH from being energised on the release of the relay K and break the operating circuit of the relay KR.

On the relay K releasing the contacts K1 and K2 have no function at this stage.

On the relay KR releasing the contacts KR1 to KR6 disconnect the apparatus group from the register. In consequence all operated relays in the register release and each of the uniselector switches homes its wipers to their first bank contacts in the following manner.

The wipers S1 to S5 have been homed subsequent to the outpulsing of the last impulse train. The driving magnet CN is thus energised from earth on the wiper S1 by way of the relay contacts BR8, the wiper CN1 and the interrupter contacts CN*dm*. The wipers CN1 to CN6 are thus homed whereafter the earth on the wiper S1 is extended over the wiper CN1 to the wiper U1. The driving magnet U consequently homes its wipers U1 to U5 and in so doing completes a circuit for the driving magnets D, C, M, CD, and BD to home their wipers in turn and in that order. When the wiper BD5 is homed it connects negative resistance battery to the lead 3 thereby indicating that the register is free for use with another call.

When the called subscriber answers it is arranged that the polarity of the voltages occurring on the line wires 16 and 17 is reversed thereby enabling the relay D to operate.

On the relay D operating the contacts D1 complete a circuit to operate the relay DR. The contacts D2 and D3 reverse the polarity of the voltages occurring on the line wires 1 and 2.

On the relay DR operating the contacts DR1 complete a circuit to hold this relay operated. The contacts DR2 prevent the driving magnet AD from becoming energised by way of the interrupter contacts AD*dm*, and the contacts DR3 complete a circuit between the relay MP and the terminal 86. Pulses of earth potential are applied to the terminal 86 at predetermined intervals in time the method of application being outside the scope of the present invention. The relay MP responds to each of these pulses by operating momentarily.

On each operation of the relay MP the contacts MP1 connect earth to the wipers AD3 and AD4 and the contacts MP2 complete a circuit to energise the driving magnet AD.

On each intervening release of the relay MP the contacts MP1 disconnect earth from the wipers AD3 and AD4 and the contacts break the energising circuit of the driving magnet AD so that each of the wipers AD1 to AD6 is stepped into engagement with the next contact of its associated bank.

As previously described, each of the relays MW and MZ is operated. A connection thus exists between the first, seventh and thirteenth contacts of the bank associated with the wiper AD4 and the lead 87. When the wiper AD4 is in engagement with any one of these bank contacts a pulse of earth potential is therefore applied to the lead 83 on the relay contacts NP1 closing. These pulses may be employed to operate the calling subscriber's meter and thus provide means for assessing the charge to be made for the call.

When the calling subscriber breaks the calling loops across the leads 1 and 2 at the end of the call, the relay A releases followed by the release of all operated relays in the apparatus group and the homing of the wipers AD1 to AD6. When the latter operation is completed the wiper AD1 connects negative resistance battery to the lead 11 thereby indicating that the apparatus group is free for use with another call.

Although in the arrangement described above the switch wipers TA3 and TA12 are divided into two groups, this may not always be possible. Thus in some instances it may be required to effect translations in which the route code comprises a large number of impulse trains. As there is a limit to the number of wipers that can be provided on any particular motor uniselector switch it may be necesasry in such cases to disperse with this facility of wiper grouping.

I claim:

1. Equipment for use at one of the exchanges in a telephone system which serves a plurality of exchanges designated by individual multi-digit exchange codes comprising a predetermined number of digits, each exchange serving a plurality of lines designated by individual multi-digit line numbers, said equipment comprising a plurality of apparatus groups, a lesser plurality of registers and a single translator, the translator including allotter means to allot the translator to any one of said registers causing a start signal to be applied to the allotter means, a plurality of switching devices and control means individual to each said switching device for switching the associated switching device to a condition characteristic of signals applied thereto, each apparatus group having an input side for receiving the individual digits of called exchange codes and of called line numbers, an output side, first switching means to select, according to the value of the digit applied thereto, one of said control means, second switching means to select an available one of the registers upon the extension of a calling line to the input side of the apparatus group, means to apply to the first switching means the first digit of a called exchange code supplied to said input side, means to apply to the register selected by the second switching means the remaining digits after the first of said called exchange code and the digits of the called line number and means responsive to the selection of a register to connect that register to the outgoing side of the apparatus group, each register including means to register the individual digits applied thereto, start means to apply a start signal to said allotter means upon the registration of said remaining digits of a called exchange code and means to signal the selecting apparatus group upon the connection of the translator to the register and to apply electric signals characteristic of the called exchange code digits registered in the register to the particular swiching devise in the translator having its control means selected by said selecting apparatus group, each apparatus group further including means which, upon the aforesaid signalling of the apparatus group by one of the registers, is adapted to operate the control means selected by the apparatus group, the translator further including means to apply routing signals characteristic of the routing digits represented by the switched condition of the selected switching device to the particular register causing said switching device to be switched to that condition and each register further including means which, upon the aforesaid application of routing signals to the register, is adapted to supply the corresponding individual routing digits to the said connection which is to the outgoing side of the apparatus group selecting the register.

2. Equipment according to claim 1 in which each translator switching device comprises an electromagnetically operated switch having a plurality of wipers and an equal plurality of contact banks, one for each wiper, the said means in any one of the registers to apply electric signals characteristic of the called exchange code digits registered in the register to the particular switching device in the translator having its control means selected, comprising means to apply an individual electric signal for each said called exchange code digit registered to a different one of a small plurality of the contact banks of said particular switching device, each said signal being thus applied to a combination of contacts of the appropriate contact bank of the small plurality so that at only one position will the associated wipers be all in contact with bank contacts to which said signals are applied, the control means of said particular switching device being operable to switch said wipers to said one position and the wipers associated with at least some of the remaining contact banks characterizing at said one position the routing signals of the translation.

3. Equipment according to claim 2 in which the said remaining wipers and associated contacts of said particular switching device are divided into two groups and in which each register includes means to select according to the value of a particular one of the remaining digits registered thereby one of said groups of wipers upon the connection of the translator to that register.

4. Equipment according to claim 1 in which the translator includes means to apply to any one of the registers obtaining connection as aforesaid to the translator a repeat code signal characteristic of the selected translator switching device and hence of the first digit of the called exchange code, each register including means responsive to the repeat code signal to supply the corresponding first digit of the called exchange code and thereafter each digit registered by the register to the said connection which is to the outgoing side of the apparatus group selecting the register.

5. Equipment according to claim 1 in which each register includes a group of electromagnetic relays to which said routing signals are applied, one at a time, each routing signal being adapted to operate a combination comprising a predetermined number of said relays, a step-by-step uniselector switch having a contact bank and associated wiper, an array of relay contacts operable by said relays to apply a marking potential to the particular contact of the uniselector contact bank determined by the operated combination of said relays and digit sending means to step said uniselector switch to said marked contact and to supply the corresponding value of routing digit to said connection which is to the outgoing side of the apparatus group selecting the register.

6. Equipment according to claim 1 in which each register includes a plurality of step-by-step uniselector switches each having a driving circuit a plurality of contact banks and a plurality of wipers, one for each contact bank, and each adapted to step its wipers in accordance with the value of the digit applied to its driving circuit, means, including one of said uniselector switches, to apply each said remaining digit of a called exchange code and each digit of a called line number to a different one of said uniselector driving circuits.

7. Equipment according to claim 6 in which said one of the uniselector switches has a series of succeeding contacts around one of its contact banks individually connected to the uniselector driving circuits, its own driving circuit being connected to the last contact of the series, there being means to apply said remaining digits and said called line number digits to the wiper associated with said one of the contact banks and means to step the wipers of said one of the said uniselector switches one contact after each said digit to said last contact of the series.

8. Equipment according to claim 1 in which said first switching means is a step-by-step uniselector switch having a plurality of contact banks and an equal plurality of wipers, one for each bank, succeeding contacts around one of the contact banks being each connected to a different one of the said control means in the translator.

9. Equipment according to claim 1 in which said second switching means is a step-by-step uniselector switch having a plurality of contact banks and an equal plurality of wipers, one for each bank, succeeding contacts around the contact banks being each connected to a different one of the said registers and corresponding contacts in each bank being connected to the same register.

10. Equipment for use at one of the exchanges in a telephone system which serves a plurality of exchanges designated by individual multi-digit exchange codes comprising a predetermined number of digits, each exchange serving a plurality of lines designated by individual multi-digit line numbers, said equipment comprising a plurality of apparatus groups, a lesser plurality of registers and a single translator, the translator including allotter means to allot the translator to any one of said registers causing a start signal to be applied to the allotter means, a plurality of switching devices and control means individual to each said switching device for switching the associated switching device to a condition characteristic of signals applied thereto, each apparatus group having an input side for receiving the individual digits of called exchange codes and of called line numbers, an output side, first switching means to select, according to the value of the digit applied thereto, one of said control means, second switching means to select an available one of the registers upon the extension of a calling line to the input side of the apparatus group, means to apply to the first switching means the first digit of a called exchange code supplied to said input side, means to apply to the register selected by the second switching means the remaining digits after the first of said called exchange code and the digits of the called line number and means responsive to the selection of a register to connect that register to the outgoing side of the apparatus group, each register including means to register the individual digits applied thereto, start means to apply a start signal to said allotter means upon the registration of said remaining digits of a called exchange code and means to signal the selecting apparatus group upon the connection of the translator to the register and to apply electric signals characteristic of the called exchange code digits registered in the register to the particular switching device in the translator having its control means selected by said selecting apparatus group, each apparatus group further including means which, upon the aforesaid signalling of the apparatus group by one of the registers, is adapted to operate the control means selected by the apparatus group, the translator further including means to apply routing signals characteristic of the routing digits of the translation, as represented by the switched condition of the selected switching device, one at a time to the particular register causing said switching device to be switched to that condition and means to indicate the end of a translation to a register and each register further including means to register a routing signal applied to the register, means to disconnect the translator from the register upon the registration of a routing signal by the register, means to supply the routing digit corresponding to a routing signal registered by the register to the said connection which is to the outgoing side of the apparatus group selecting the register and thereafter to cause said start means to apply a start signal to said allotter means and means responsive to the indication by the translator of the end of a translation to prevent application of a start signal to said allotter means.

11. In a telephone system serving a plurality of exchanges designated by individual multi-digit exchange codes comprising a predetermined number of digits, each exchange serving a plurality of lines designated by individual multi-digit line numbers; equipment provided at one of the said exchanges and comprising a plurality of apparatus groups, a lesser plurality of registers and a single translator, the translator including allotter means to allot the translator to any one of said registers causing a start signal to be applied to the allotter means, a plurality of switching devices and control means individual to each said switching device for switching the associated switching device to a condition characteristic of signals applied thereto, each apparatus group having an input side for receiving the individual digits of called exchange codes and of called line numbers, an output side, first switching means to select, according to the value of the digit applied thereto, one of said control means, second switching means to select an available one of the registers upon the extension of a calling line to the input side of the apparatus group, means to apply to the first switching means the first digit of a called exchange code supplied over the calling line, means to apply to the register selected by the second switching means the remaining digits after the first of said called exchange code and the digits of the called line number and means responsive to the selection of a register to connect that register to the outgoing side of the apparatus group, each register including means to register the individual digits applied thereto, start means to apply a start signal to said allotter means upon the registration of said remaining digits of a called exchange code and means to signal the selecting apparatus group upon the connection of the translator to the register and to apply electric signals characteristic of the called exchange code digits registered in the register to the particular switching device in the translator having its control means selected by said selecting apparatus group, each apparatus group further including means which, upon the aforesaid signalling of the apparatus group by one of the registers, is adapted to operate the control means selected by the apparatus group, the translator further including means to apply routing signals characteristic of the routing digits of the translation, as represented by the switched condition of the selected switching device, to the particular register causing said switching device to be switched to that condition and each register further including means which, upon the aforesaid application of routing signals to the register, is adapted to supply the corresponding individual routing digits to the said connection which is to the outgoing side of the apparatus group selecting the register.

12. In a telephone system serving a plurality of exchanges designated by individual multi-digit exchange codes comprising a predetermined number of digits, each exchange serving a plurality of lines designated by individual multi-digit line numbers; equipment provided at one of the said exchanges and comprising a plurality of apparatus groups, a lesser plurality of registers and a single translator, the translator including allotter means to allot the translator to any one of said registers causing a start signal to be applied to the allotter means, a plurality of switching devices and control means individual to each said switching device for switching the associated switching device to a condition characteristic of signals applied thereto, each apparatus group having an input side for receiving the individual digits of called exchange codes and of called line numbers, an output side, first switching means to select, according to the value of the digit applied thereto, one of said control means, second switching means to select an available one of the registers upon the extension of a calling line to the input side of the apparatus group, means to apply to the first switching means the first digit of a called exchange code supplied over the calling line, means to apply to the register selected by the second switching means the remaining digits after the first of said called exchange code and the digits of the called line number and means responsive to the selection of a register to connect that register to the outgoing side of the apparatus group, each register including means to register the individual digits applied thereto, start means to apply a start signal to said allotter means upon the registration of said remaining digits of a called exchange code and means to signal the selecting apparatus group upon the connection of the translator to the register and to apply electric signals characteristic of the called exchange code digits registered in the register to the particular switching device in the translator having its control means selected by said selecting apparatus group, each apparatus group further including means which, upon the aforesaid signalling of the apparatus group by one of the registers, is adapted to operate the control means selected by the apparatus group, the translator further including means to apply routing signals characteristic of the routing digits of the translation, as represented by the switched condition of the selected switching device, one at a time to the particular register causing said switching device to be switched to that condition and means to indicate the end of a translation to a register and each register further including means register a routing signal applied to the register, means to disconnect the translator from the register upon the registration of a routing signal by the register, means to supply the routing digit corresponding to a routing signal registered by the register to the said connection which is to the outgoing side of the apparatus group selecting the register and thereafter to cause said start means to apply a start signal to said allotter means and means responsive to the indication by the translator of the end of a translation to prevent application of a start signal to said allotter means.

13. In a telephone system serving a plurality of exchanges designated by individual multi-digit exchange codes comprising a predetermined number of digits, each exchange serving a plurality of lines designated by individual multi-digit line numbers and each exchange including switching apparatus; equipment provided at one of the said exchanges and comprising a plurality of apparatus groups, a lesser plurality of registers and a single translator, each apparatus group having an input side for receiving the individual digits of called exchange codes and of called line numbers and an output side, the said input sides being individually connected to switching means at said one of the exchanges whereby calling lines are extended each to a different one of the apparatus groups, and the output side being individually connected to junction equipment whereby said calling lines are each further extended to any one of said exchanges under the control of individual routing digits which results from the translation by said equipment of the exchange codes supplied to the apparatus groups, the translator including allotter means to allot the translator to any one of said registers causing a start signal to be applied to the allotter means, a plurality of switching devices and control means individual to each said switching device for switching the associated switching device to a condition characteristic of signals applied thereto, each apparatus group including first switching means to select, according to the value of the digit applied thereto, one of said control means, second switching means to select an available one of the registers upon the extension of a calling line to the input side of the apparatus group, means to apply to the first switching means the first digit of a called exchange code supplied over the calling line, means to apply to the register selected by the second switching means the remaining digits after the first of said called exchange code and the digits of the called line number and means responsive to the selection of a register to connect that register to the outgoing side of the apparatus group, each register including means to register the individual digits applied thereto, start means to apply a start signal to said allotter means upon the registration of said remaining digits of a called exchange code and means to signal the selecting apparatus group upon the connection of the translator to the register and to apply electric signals characteristic of the called exchange code digits registered in the register to the particular switching device in the translator having its control means selected by said selecting apparatus group, each apparatus group further including means which, upon the aforesaid signalling of the apparatus group by one of the registers, is adapted to operate the control means selected by the apparatus group, the translator further including means to apply routing signals characteristic of the routing digits of the translation, as represented by the switched condition of the selected switching device, to the particular register causing said switching device to be switched to that condition and each register further including means which, upon the aforesaid application of routing signals to the register, is adapted to supply the corresponding individual routing digits to the said connection which is to the outgoing side of the apparatus group selecting the register.

References Cited in the file of this patent
UNITED STATES PATENTS

| | | |
|---|---|---|
| 2,597,209 | Walsh | May 20, 1952 |
| 2,631,195 | Ostline | Mar. 10, 1953 |